United States Patent
Kimura et al.

(10) Patent No.: US 9,404,670 B2
(45) Date of Patent: Aug. 2, 2016

(54) WATER HEATER

(71) Applicant: NORITZ CORPORATION, Hyogo (JP)

(72) Inventors: Sakiko Kimura, Himeji (JP); Takeshi Oohigashi, Kakogawa (JP); Yasutaka Kuriyama, Kakogawa (JP); Shuji Kameyama, Himeji (JP)

(73) Assignee: NORITZ CORPORATION, Hyogo (JP)

( * ) Notice: Subject to any disclaimer, the term of this patent is extended or adjusted under 35 U.S.C. 154(b) by 97 days.

(21) Appl. No.: 14/561,068

(22) Filed: Dec. 4, 2014

(65) Prior Publication Data

US 2015/0176862 A1    Jun. 25, 2015

(30) Foreign Application Priority Data

Dec. 25, 2013  (JP) .................................. 2013-267354
Jun. 9, 2014  (JP) .................................. 2014-118514

(51) Int. Cl.
  *F24H 9/16*  (2006.01)
  *F24H 8/00*  (2006.01)
  *F24H 1/43*  (2006.01)
  *F24H 9/00*  (2006.01)
  *F23L 17/00*  (2006.01)

(52) U.S. Cl.
  CPC .............. *F24H 8/006* (2013.01); *F23L 17/005* (2013.01); *F24H 1/43* (2013.01); *F24H 9/0026* (2013.01); *Y02B 30/106* (2013.01)

(58) Field of Classification Search
  CPC ............. F24H 8/00; F24H 8/006; F24H 9/00; F24H 9/16; F24H 1/14; F24H 6/00; F23L 1/00; F23L 17/14
  USPC ............................... 122/15.1, 18.1, 44.1, 5.51
  See application file for complete search history.

(56) References Cited

U.S. PATENT DOCUMENTS 4,444,156 A * 4/1984 Iwasaki .................. F24H 1/145
                                                110/203
6,415,744 B1 * 7/2002 Choi ....................... F23L 17/00
                                                 122/15.1

(Continued)

FOREIGN PATENT DOCUMENTS

JP       60-186617 A    9/1985
JP     2003-232567 A    8/2003

(Continued)

OTHER PUBLICATIONS

Decision to Grant Patent; issued by the Japanese Patent Office on Oct. 27, 2015, which corresponds to Japanese Patent Application No. 2014-118514 and is related to U.S. Appl. No. 14/561,068; with English language translation.

*Primary Examiner* — Gregory A Wilson
(74) *Attorney, Agent, or Firm* — Studebaker & Brackett PC

(57) ABSTRACT

A fan serves to suction combustion gas which has passed through a secondary heat exchanger and emitting combustion gas to the outside of a water heater. A drainage water discharge pipe is connected to the secondary heat exchanger in order to discharge the drainage water produced as a result of recovery of latent heat in the secondary heat exchanger to the outside of the secondary heat exchanger. An air passage pipe is connected to an exhaust box. A Y-shaped pipe joint has a flow path allowing merging of the drainage water discharge pipe and the air passage pipe, and the flow path after merging leads to the outside of the water heater.

20 Claims, 20 Drawing Sheets

(56) References Cited

U.S. PATENT DOCUMENTS

| | | | | |
|---|---|---|---|---|
| 6,840,198 B2* | 1/2005 | Kang | ............ | F23N 1/022 |
| | | | | 122/14.1 |
| 2002/0014233 A1* | 2/2002 | Gatley, Jr. | ............ | F04D 25/082 |
| | | | | 126/110 R |
| 2009/0133642 A1* | 5/2009 | Asakura | ............ | F22D 1/10 |
| | | | | 122/32 |
| 2011/0061832 A1* | 3/2011 | Albertson | ............ | F24D 5/04 |
| | | | | 165/45 |
| 2011/0155079 A1* | 6/2011 | Matsunaga | ............ | F24H 1/40 |
| | | | | 122/15.1 |

FOREIGN PATENT DOCUMENTS

| | | |
|---|---|---|
| JP | 2013-092295 A | 5/2013 |
| JP | 2013-160453 A | 8/2013 |

* cited by examiner

WATER HEATER

BACKGROUND OF THE INVENTION

1. Field of the Invention

The present invention relates to a water heater and particularly to a water heater of a latent heat recovery type capable of heating water by recovering latent heat of combustion gas.

2. Description of the Background Art

In replacement of an already placed tank water heater with an instantaneous water heater, there are locations where an already placed exhaust pipe (a B vent) cannot be removed from a point of view of maintaining appearance of buildings.

At such a location, a water heater can be replaced by leaving the already placed exhaust pipe and inserting an exhaust tube (a flexible exhaust tube) in the exhaust pipe. The exhaust tube should be smaller in diameter, because the exhaust tube cannot be placed in the exhaust pipe if the exhaust tube has a large outer diameter. In order to maintain a stable combustion state even when the exhaust tube is decreased in diameter, an exhaust suction and combustion system should be adopted for a water heater.

A water heater adapted to this exhaust suction and combustion system is disclosed, for example, in Japanese Patent Laying-Open No. 60-186617. In the water heater described in this publication, a heat exchanger for recovering sensible heat, a heat exchanger for recovering latent heat, and a fan are arranged in this order on a downstream side in a flow of combustion gas produced in a burner. Namely, in the water heater of this type, the fan is arranged downstream of the heat exchanger for recovering latent heat in the flow of combustion gas.

Since the fan is arranged downstream of the heat exchanger for recovering latent heat in the water heater adapted to the exhaust suction and combustion system, air (outside air) is taken in from the outside of the water heater through a discharge pipe for discharging drainage water. A direction of flow of air in this discharge pipe is reverse to a direction of discharge of drainage water through the discharge pipe. Therefore, disadvantageously, drainage water is less dischargeable through the discharge pipe to the outside of the water heater but is likely to stay in the heat exchanger for recovering latent heat.

Even though a water-seal structure capable of cutting off intake of outside air owing to drainage water being stored is adopted in a drainage water discharge path such as the discharge pipe above, air is taken in from the outside of the water heater through the discharge pipe during a period until water-seal is completed by drainage water being stored. A disadvantage the same as above is thus caused.

SUMMARY OF THE INVENTION

The present invention was made in view of the problems above, and an object thereof is to provide a water heater in which drainage water is less likely to stay in a heat exchanger.

A water heater according to the present invention is a water heater of a latent heat recovery type capable of heating water by recovering latent heat of combustion gas, and includes a burner, a heat exchanger, a fan, a drainage water discharge pipe, an air passage pipe, and a pipe connection portion. The burner serves to produce combustion gas. The heat exchanger serves to heat water which flows through the inside, through heat exchange with combustion gas produced in the burner. The fan serves to suction combustion gas which has passed through the heat exchanger and to emit combustion gas to the outside of the water heater. The drainage water discharge pipe is connected to the heat exchanger for discharging drainage water produced as a result of recovery of latent heat by the heat exchanger to the outside of the heat exchanger. The air passage pipe is connected to a path for flow of combustion gas from the heat exchanger to the fan. The pipe connection portion has a flow path allowing merging of the drainage water discharge pipe and the air passage pipe, and the flow path after merging leads to the outside of the water heater.

According to the water heater in the present invention, the pipe connection portion has a flow path allowing merging of the drainage water discharge pipe and the air passage pipe and the flow path after merging leads to the outside of the water heater. Therefore, air which enters the inside of the water heater through the pipe connection portion from the outside of the water heater is diverted to both of the drainage water discharge pipe and the air passage pipe from the pipe connection portion. Thus, as compared with a case that air passes only through the drainage water discharge pipe, a flow rate of air which passes through the drainage water discharge pipe can be decreased. Therefore, discharge of drainage water through the drainage water discharge pipe is facilitated and drainage water is less likely to stay in the heat exchanger.

The water heater above further includes an exhaust box forming at least a part of the path for flow of combustion gas between the heat exchanger and the fan. The air passage pipe is connected between the pipe connection portion and the exhaust box.

In such a case that the air passage pipe is connected to the exhaust box as well, air which enters the inside of the water heater through the pipe connection portion from the outside of the water heater can be diverted to both of the drainage water discharge pipe and the air passage pipe from the pipe connection portion. Thus, as described above, drainage water is less likely to stay in the heat exchanger.

In the water heater above, the fan includes a blade, a drive source, and a rotation shaft connecting the blade and the drive source to each other. The air passage pipe opens into a region opposed to a direction of an axis line of the rotation shaft of the blade.

Thus, the air passage pipe can open into the region in the water heater where a negative pressure is high. Therefore, a flow rate of air which passes through the air passage pipe, of the drainage water discharge pipe and the air passage pipe, can be increased, and accordingly, a flow rate of air which passes through the drainage water discharge pipe can be lowered. Therefore, discharge of drainage water through the drainage water discharge pipe can further be facilitated.

In the water heater above, the air passage pipe is connected between the pipe connection portion and the heat exchanger.

In such a case that the air passage pipe is connected to the heat exchanger as well, air which enters the inside of the water heater through the pipe connection portion from the outside of the water heater can be diverted to both of the drainage water discharge pipe and the air passage pipe from the pipe connection portion. Thus, as described above, drainage water is less likely to stay in the heat exchanger.

In the water heater above, the air passage pipe is connected at a position closer to the fan of the heat exchanger than the drainage water discharge pipe.

Thus, the air passage pipe can open into the region in the heat exchanger where a negative pressure is higher than in the drainage water discharge pipe. Therefore, a flow rate of air which passes through the air passage pipe, of the drainage water discharge pipe and the air passage pipe, can be increased, and accordingly, a flow rate of air which passes through the drainage water discharge pipe can be lowered.

Therefore, discharge of drainage water through the drainage water discharge pipe can further be facilitated.

In the water heater above, an inner diameter of the air passage pipe is set to be greater than an inner diameter of the drainage water discharge pipe.

Thus, the air passage pipe can allow passage of air more than the drainage water discharge pipe, and accordingly, a flow rate of air which passes through the drainage water discharge pipe can be lowered. Therefore, discharge of drainage water through the drainage water discharge pipe is facilitated and drainage water is less likely to stay in the heat exchanger.

In the water heater above, the pipe connection portion is a pipe joint allowing merging of the drainage water discharge pipe and the air passage pipe. The water heater further includes a tank connection pipe connected to the pipe joint and a drainage water tank connected to the pipe joint with the tank connection pipe being interposed. An inner diameter of the tank connection pipe is set to be greater than an inner diameter of the drainage water discharge pipe.

Thus, only some of air which passes through the tank connection pipe can flow to the drainage water discharge pipe. Therefore, a flow rate of air which passes through the drainage water discharge pipe can be lowered, discharge of drainage water through the drainage water discharge pipe is facilitated, and drainage water is less likely to stay in the heat exchanger.

In the water heater above, the pipe connection portion is a drainage water tank allowing merging of the drainage water discharge pipe and the air passage pipe. The drainage water discharge pipe and the air passage pipe are connected to the drainage water tank as being separate from each other.

Thus, in such a case that the drainage water discharge pipe and the air passage pipe are merged in the drainage water tank as well, air which enters the inside of the water heater through the connection portion from the outside of the water heater can be diverted to both of the drainage water discharge pipe and the air passage pipe. Thus, as described above, drainage water is less likely to stay in the heat exchanger.

In the water heater above, the drainage water tank includes a drainage water storage portion for storing drainage water and a drainage water discharge portion for discharging the drainage water in the drainage water storage portion to the outside of the drainage water storage portion. In the drainage water tank, a partition portion having a communication hole serves as partition between a first space into which the drainage water discharge pipe opens and a second space into which the air passage pipe opens. An opening of the air passage pipe in the drainage water tank is located at a height position lower than a height position of a lower end portion of a drainage water discharge opening leading to the drainage water discharge portion provided in the drainage water storage portion. The second space is located downstream of the first space in a drainage water discharge path.

As described above, in the drainage water tank, the partition portion serves as the partition between the first space into which the drainage water discharge pipe opens and the second space into which the air passage pipe opens, and the second space is located downstream of the first space in the drainage water discharge path. Therefore, the air passage pipe is located closer to the drainage water discharge opening than the drainage water discharge pipe. Therefore, before water-sealing of the drainage water tank, air outside the water heater is preferentially taken into the air passage pipe closer to the drainage water discharge opening than the drainage water discharge pipe. Thus, air outside the water heater is less likely to be taken into the drainage water discharge pipe and discharge of drainage water through the drainage water discharge pipe is facilitated.

By decreasing an area of an opening in the partition portion serving as the partition between the first space and the second space, resistance can be provided to a flow of air which enters the first space from the second space through the opening. Since an amount of air which enters the first space from the second space can thus be decreased, air outside the water heater is further less likely to be taken into the drainage water discharge pipe and discharge of drainage water through the drainage water discharge pipe is further facilitated.

The opening of the air passage pipe is located at the height position lower than the height position of the lower end portion of the drainage water discharge opening. Therefore, when the drainage water tank is filled with drainage water, the opening of the air passage pipe is blocked by drainage water and water-sealed. Thus, after the drainage water tank is filled, unnecessary air will not be taken into the air passage pipe from the outside of the water heater, and fan efficiency can be enhanced.

In the water heater above, the pipe connection portion is a pipe joint allowing merging of the drainage water discharge pipe and the air passage pipe. The water heater further includes a trap pipe which is connected to the pipe joint and has a drain trap which can water-seal a flow path with drainage water.

Even in such a case that no drainage water tank is provided, the drainage water discharge pipe and the air passage pipe are merged with each other so that air which enters the inside of the water heater through the pipe connection portion from the outside of the water heater is diverted to both of the drainage water discharge pipe and the air passage pipe. Thus, as described above, drainage water is less likely to stay in the heat exchanger. Furthermore, since the trap pipe is connected to the pipe joint, drainage water can form a drain trap.

The water heater above further includes a fan drainage water drain pipe connected to the fan, for discharging drainage water in the fan to the outside of the fan.

With this fan drainage water drain pipe, drainage water in the fan can be discharged to the outside of the fan.

In the water heater above, the fan drainage water drain pipe is connected between the fan and the heat exchanger. A drainage water drain port of the heat exchanger leading to the drainage water discharge pipe is located on an extension of the fan drainage water drain pipe in the heat exchanger.

Thus, an air current directed from the opening within the heat exchanger of the fan drainage water drain pipe toward the opening of the drainage water drain pipe can be produced by a fan discharge pressure. This air current can promote discharge of drainage water within the heat exchanger to the drainage water discharge pipe.

In the water heater above, the fan drainage water drain pipe is connected between the fan and the heat exchanger. The fan drainage water drain pipe is arranged so as to at least reach a drainage water drain port of the heat exchanger leading to the drainage water discharge pipe.

Thus, owing to the fan discharge pressure, a gas, together with drainage water, can be blown into the drainage water discharge pipe through the fan drainage water drain pipe. Therefore, discharge of drainage water within the heat exchanger to the outside of the heat exchanger through the drainage water discharge pipe can be promoted.

In the water heater above, the pipe connection portion is a pipe joint allowing merging of the drainage water discharge pipe and the air passage pipe. The water heater further includes a fan drainage water drain pipe connected to the fan, for discharging drainage water in the fan to the outside of the fan, a tank connection pipe connected to the pipe joint, and a drainage water tank connected to the pipe joint with the tank connection pipe being interposed. The fan drainage water drain pipe is connected to the drainage water tank as being separate from the drainage water discharge pipe.

Thus, drainage water within the fan can effectively be discharged into the drainage water tank owing to the fan discharge pressure.

In the water heater above, the drainage water tank includes a drainage water storage portion for storing drainage water and a drainage water discharge portion for discharging the drainage water in the drainage water storage portion to the outside of the drainage water storage portion. An opening of the fan drainage water drain pipe in the drainage water tank is located at a height position lower than a height position of a lower end portion of a drainage water discharge opening leading to the drainage water discharge portion provided in the drainage water storage portion.

By connecting the fan drainage water drain pipe to the fan, air within the fan is blown through the fan drainage water drain pipe owing to the fan discharge pressure, and hence efficiency in exhaust by the fan may lower. Here, the opening of the fan drainage water drain pipe within the drainage water tank is arranged at a position lower than the lower end portion of the drainage water discharge opening. Thus, when drainage water is stored in the drainage water tank and the drainage water tank is filled with drainage water, the opening of the fan drainage water drain pipe is immersed in the drainage water and air within the fan is less likely to escape through the fan drainage water drain pipe into the drainage water tank. Therefore, lowering in fan efficiency due to escape of air within the fan through the fan drainage water drain pipe can be suppressed.

In the water heater above, a distance in a direction of height between the height position of the lower end portion of the drainage water discharge opening and the height position of the opening of the fan drainage water drain pipe within the drainage water tank is 80 mm or greater.

Thus, when drainage water is stored in the drainage water tank, a head (a pressure head) of the drainage water within the fan drainage water drain pipe can be higher than a fan discharge pressure. Therefore, escape of air within the fan into the drainage water tank through the fan drainage water drain pipe and bubbling of drainage water stored in the drainage water tank can be prevented.

As described above, according to the present invention, a water heater in which drainage water is less likely to stay in a heat exchanger can be realized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

A construction of a water heater in one embodiment of the present invention will initially be described with reference to FIGS. 1 to 5.

Figure 1:
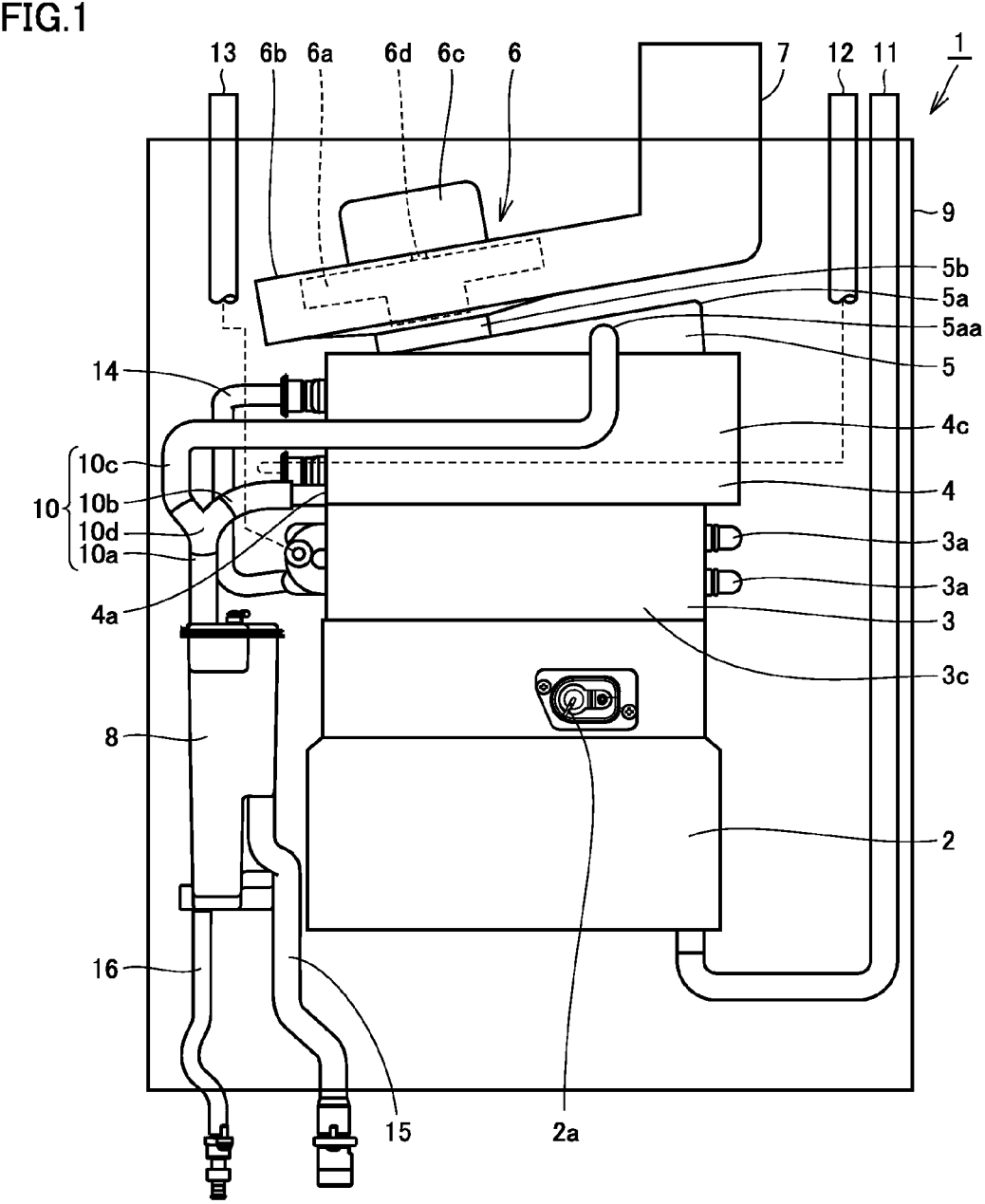
FIG. 1 is a front view schematically showing a construction of a water heater in one embodiment of the present invention.
Figure 2:
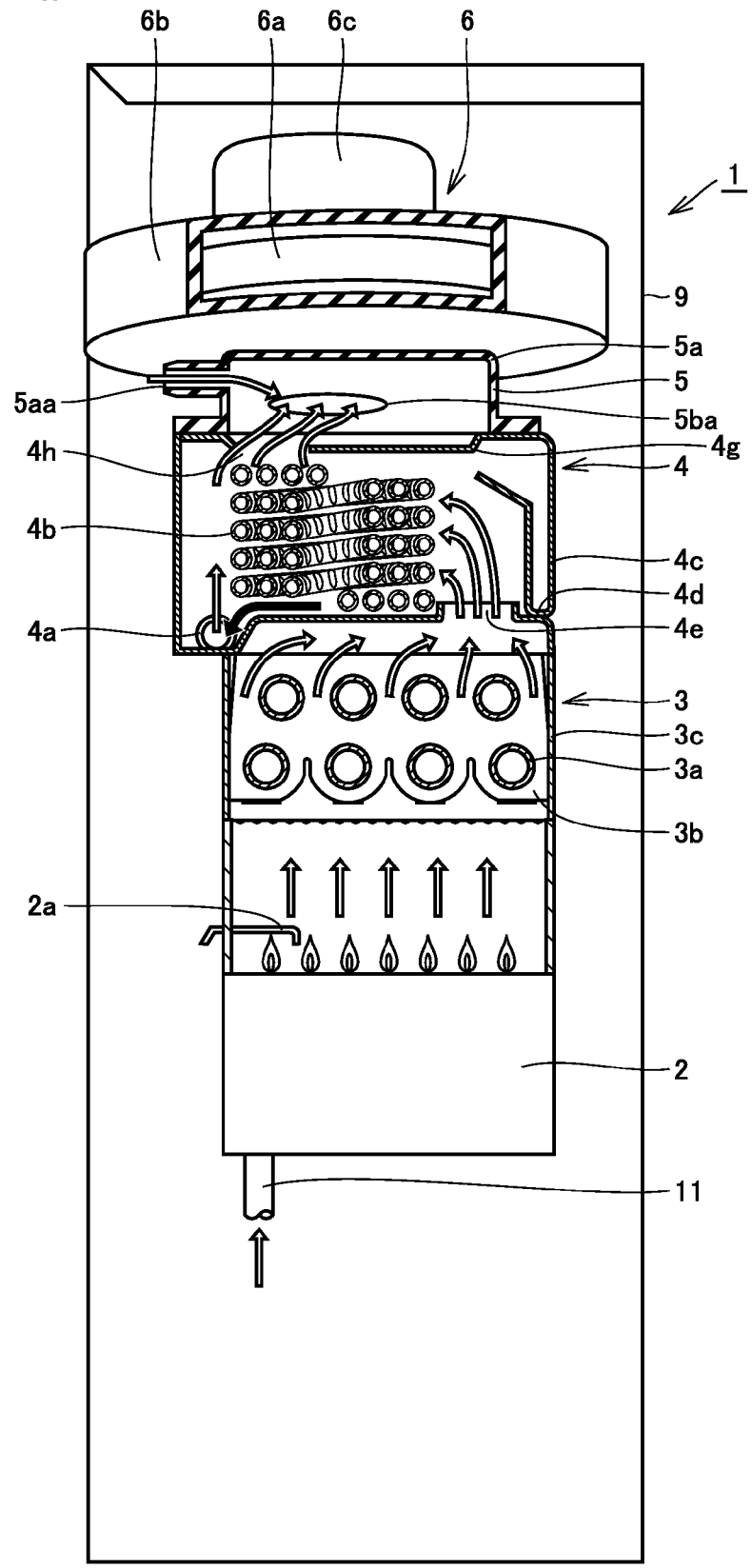
FIG. 2 is a partial cross-sectional side view schematically showing the construction of the water heater shown in FIG. 1.

Referring mainly to FIGS. 1 and 2, a water heater 1 in the present embodiment is a water heater of a latent heat recovery type adapted to an exhaust suction and combustion system. This water heater 1 mainly has a burner 2, a primary heat exchanger 3, a secondary heat exchanger 4, an exhaust box 5, a fan 6, an exhaust tube 7, a drainage water tank 8, a housing 9, and pipes 10 to 16.

Burner 2 serves to produce combustion gas by burning a fuel gas. A gas supply pipe 11 is connected to burner 2. This gas supply pipe 11 serves to supply a fuel gas to burner 2. A gas valve (not shown) implemented, for example, by an electromagnetic valve is attached to this gas supply pipe 11.

A spark plug 2a is arranged above burner 2. This spark plug 2a serves to ignite an air fuel mixture injected from burner 2 to thereby produce a flame, by generating sparks between the plug and a target (not shown) provided in burner 2. Burner 2 generates a quantity of heat by burning a fuel gas supplied from gas supply pipe 11 (which is called a combustion operation).

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 2, and specifically, it serves to heat water which flows through heat conduction pipe 3a of primary heat exchanger 3 with the quantity of heat generated as a result of the combustion operation of burner 2.

Figure 3:
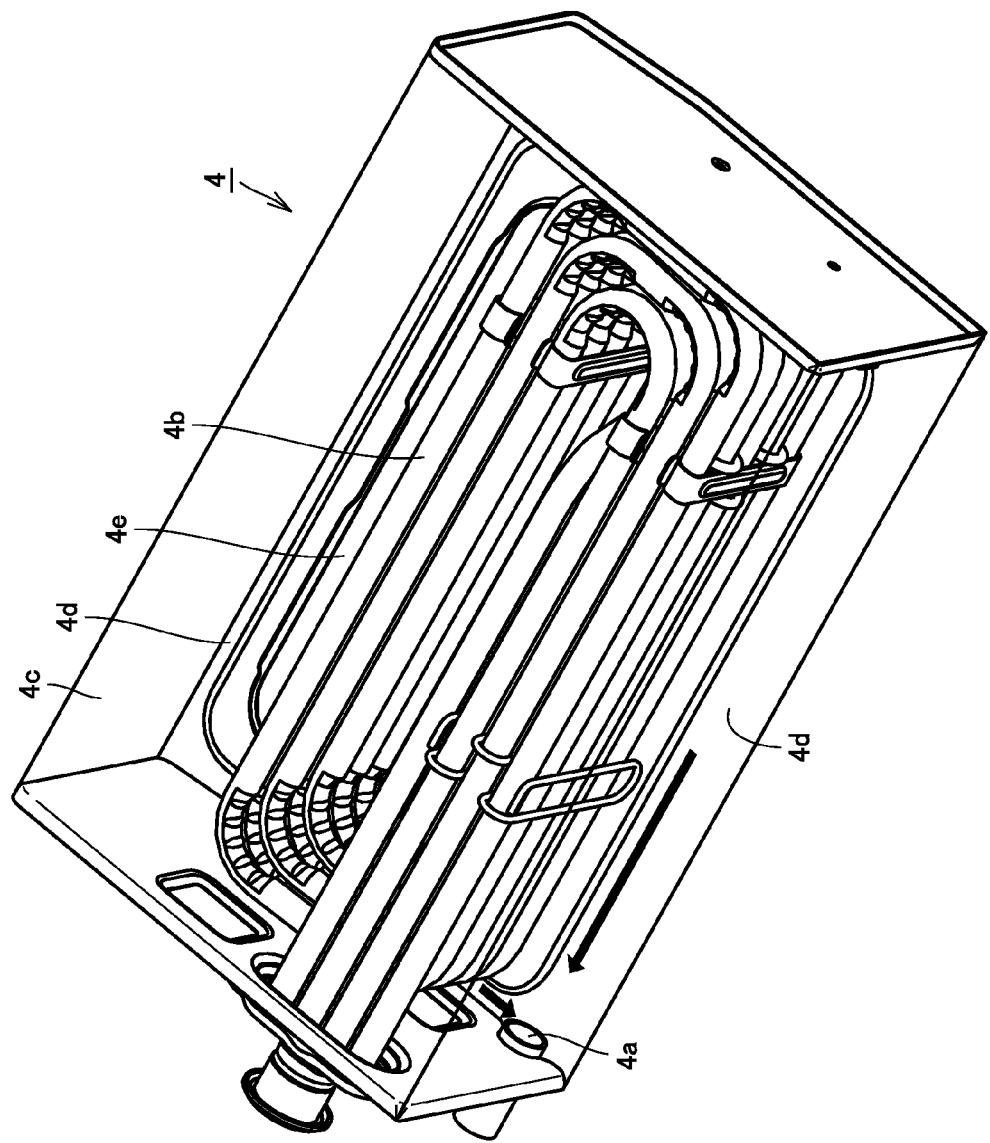
FIG. 3 is a schematic perspective view for illustrating a construction of a secondary heat exchanger of the water heater shown in FIG. 1 and a drainage water discharge path within the secondary heat exchanger.

Referring mainly to FIGS. 2 and 3, secondary heat exchanger 4 is a heat exchanger of a latent heat recovery type. This secondary heat exchanger 4 is located downstream of primary heat exchanger 3 in a flow of combustion gas and connected in series with primary heat exchanger 3. Since water heater 1 according to the present embodiment thus has secondary heat exchanger 4 of a latent heat recovery type, it is a water heater of the latent heat recovery type.

Secondary heat exchanger 4 mainly has a drainage water drain port 4a, a heat conduction pipe 4b, a sidewall 4c, a bottom wall 4d, and an upper wall 4g. Heat conduction pipe 4b is layered as it is spirally wound. Sidewall 4c, bottom wall 4d, and upper wall 4g are arranged to surround heat conduction pipe 4b.

In secondary heat exchanger 4, water which flows through heat conduction pipe 4b is pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. In addition, latent heat is recovered in secondary heat exchanger 4 and moisture contained in combustion gas is condensed, whereby drainage water is produced.

Bottom wall 4d serves as a partition between primary heat exchanger 3 and secondary heat exchanger 4, and it also serves as an upper wall of primary heat exchanger 3. This bottom wall 4d is provided with an opening portion 4e, and this opening portion 4e allows communication between a space where heat conduction pipe 3a of primary heat exchanger 3 is arranged and a space where heat conduction pipe 4b of secondary heat exchanger 4 is arranged. As shown with hollow arrows in FIG. 2, combustion gas can flow from primary heat exchanger 3 to secondary heat exchanger 4 through opening portion 4e. In this embodiment, for the sake of simplification, bottom wall 4d of secondary heat exchanger 4 and the upper wall of primary heat exchanger 3 are common, however, an exhaust collection and guide member may be connected between primary heat exchanger 3 and secondary heat exchanger 4.

Upper wall 4g is provided with an opening portion 4h, and this opening portion 4h allows communication between the space where heat conduction pipe 4b of secondary heat exchanger 4 is arranged and an internal space in exhaust box 5. As shown with hollow arrows in FIG. 2, combustion gas can flow from secondary heat exchanger 4 into the internal space in exhaust box 5 through opening portion 4h.

Drainage water drain port 4a is provided in sidewall 4c or bottom wall 4d. This drainage water drain port 4a opens at a lowest position in the space surrounded by side wall 4c, bottom wall 4d and upper wall 4g (a lowermost position in a vertical direction in a state of placement of the water heater), which is lower than a lowermost portion of heat conduction pipe 4b. Thus, drainage water produced in secondary heat exchanger 4 can be guided to drainage water drain port 4a along bottom wall 4d and sidewall 4c as shown with a black arrow in FIGS. 2 and 3.

Figure 4:
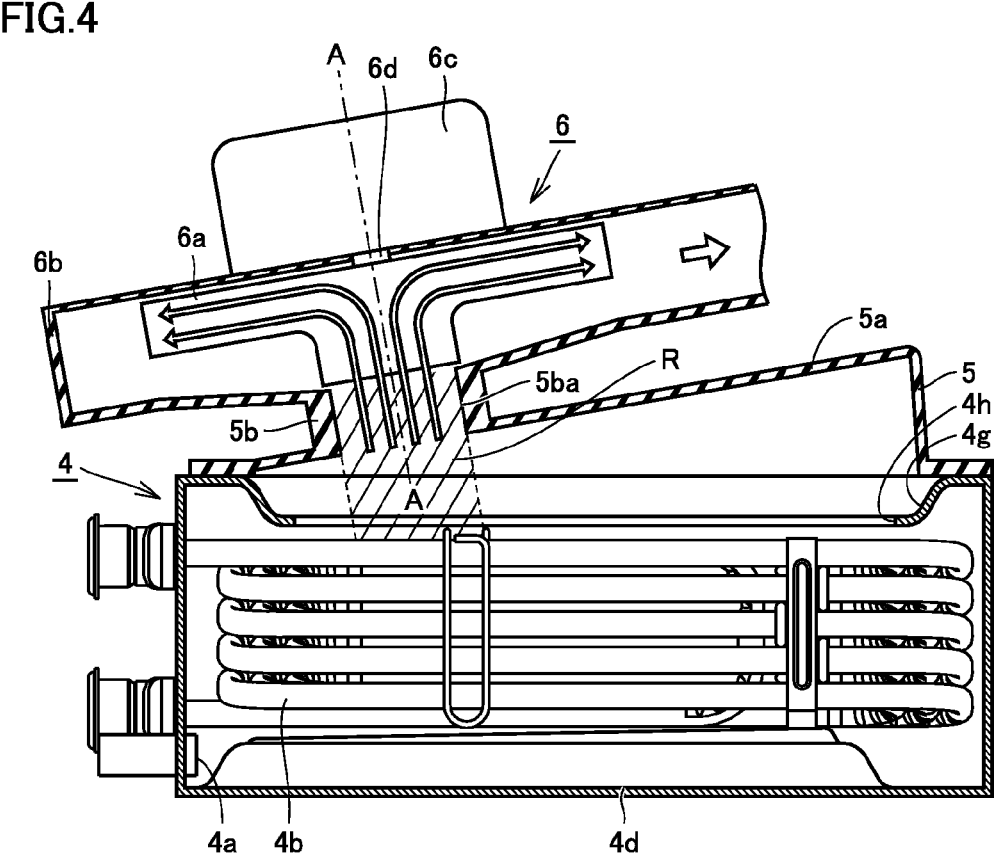
FIG. 4 is a partial cross-sectional view showing a fan and the secondary heat exchanger in an enlarged manner, for illustrating a construction of the fan of the water heater shown in FIG. 1.

Referring mainly to FIGS. 2 and 4, exhaust box 5 forms a path for a flow of combustion gas between secondary heat exchanger 4 and fan 6. This exhaust box 5 can guide combustion gas of which heat has been exchanged in secondary heat exchanger 4 to fan 6. Exhaust box 5 is attached to secondary heat exchanger 4 and located downstream of secondary heat exchanger 4 in the flow of combustion gas.

Exhaust box 5 mainly has a box main body 5a and a fan connection portion 5b. An internal space in box main body 5a communicates with the internal space where heat conduction pipe 4b of secondary heat exchanger 4 is arranged through opening portion 4h in secondary heat exchanger 4. A pipe connection portion 5aa is provided, for example, in a side portion of box main body 5a, so as to lead to the internal space in box main body 5a. Fan connection portion 5b is provided so as to protrude from an upper portion of box main body 5a. This fan connection portion 5b has, for example, a cylindrical shape, and an internal space 5ba thereof communicates with the internal space in box main body 5a.

Referring mainly to FIGS. 1 and 2, fan 6 serves to emit combustion gas (of which heat has been exchanged in secondary heat exchanger 4) which has passed through secondary heat exchanger 4 to the outside of water heater 1 by suctioning combustion gas, and the fan is connected to exhaust tube 7 located outside water heater 1.

This fan 6 is located downstream of exhaust box 5 and secondary heat exchanger 4 in the flow of combustion gas. Namely, in water heater 1, burner 2, primary heat exchanger 3, secondary heat exchanger 4, exhaust box 5, and fan 6 are disposed in this order from upstream to downstream in the flow of combustion gas produced in burner 2. Since combustion gas is suctioned and exhausted by means of fan 6 as above in this arrangement, water heater 1 in the present embodiment is the water heater adapted to the exhaust suction and combustion system.

Fan 6 mainly has a blade 6a, a fan case 6b, a drive source 6c, and a rotation shaft 6d. Fan case 6b is attached to fan connection portion 5b of exhaust box 5 such that an internal space in fan case 6b and the internal space in fan connection portion 5b communicate with each other. Thus, as shown with hollow arrows in FIGS. 2 and 4, combustion gas can be suctioned from box main body 5a of exhaust box 5 through fan connection portion 5b into fan case 6b.

Referring mainly to FIG. 4, blade 6a is arranged in fan case 6b. This blade 6a is connected to drive source 6c with rotation shaft 6d being interposed. Thus, blade 6a is provided with drive force from drive source 6c and can rotate around rotation shaft 6d. With rotation of blade 6a, combustion gas in exhaust box 5 can be suctioned from an inner circumferential side of blade 6a and can be emitted toward an outer circumferential side of blade 6a.

Referring mainly to FIG. 1, exhaust tube 7 is arranged outside water heater 1 and is connected to an outer circumferential side of fan case 6b. Therefore, combustion gas emitted to the outer circumferential side by blade 6a of fan 6 can be emitted to the outside of water heater 1 through exhaust tube 7.

Referring mainly to FIG. 2, combustion gas produced by burner 2 as above is suctioned by fan 6 with rotation of blade 6a above, so that combustion gas can reach fan 6 after passage through primary heat exchanger 3, secondary heat exchanger 4, and exhaust box 5 in this order as shown with the hollow arrows in the figure and can be exhausted to the outside of water heater 1.

Figure 5:
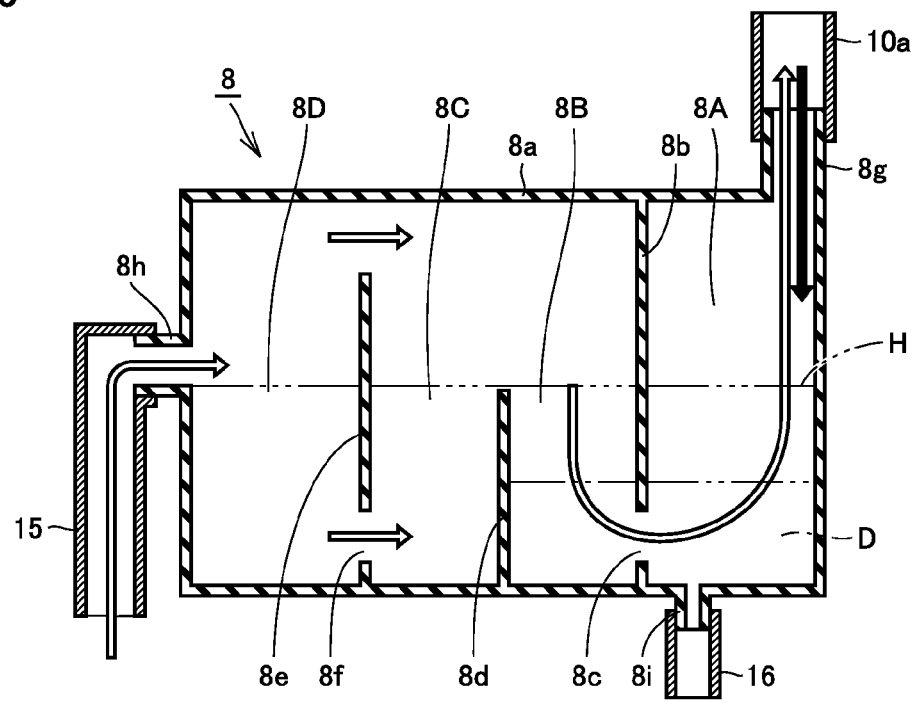
FIG. 5 is a cross-sectional view schematically showing a construction within a drainage water tank of the water heater shown in FIG. 1.

Referring mainly to FIGS. 1 and 5, drainage water tank 8 serves to store drainage water produced in secondary heat exchanger 4. This drainage water tank 8 mainly has a drainage water storage portion 8a, wall portions 8b, 8d, and 8e, a drainage water introduction portion 8g, a drainage water discharge portion 8h, and a drainage water outlet port 8i.

An internal space in drainage water storage portion 8a is partitioned into spaces 8A to 8D by wall portions 8b, 8d, and 8e. Wall portion 8b serves as partition between space 8A and space 8B, and space 8A and space 8B communicate with each other through a hole 8c provided in a lower portion of wall portion 8b. Wall portion 8d serves as partition between space 8B and space 8C, and space 8B and space 8C communicate with each other above wall portion 8d. Wall portion 8e serves as partition between space 8C and space 8D, and space 8C and space 8D communicate with each other through a hole 8f provided in a lower portion of wall portion 8e and above wall portion 8e.

Drainage water introduction portion 8g is provided in a top portion of drainage water storage portion 8a so as to lead to space 8A, and drainage water discharge portion 8h is provided at a prescribed height position in drainage water storage portion 8a so as to lead to space 8D.

This drainage water tank 8 has a water-seal structure. Namely, drainage water tank 8 has such a structure that, as a level of drainage water stored in a lower portion of each of space 8A and space 8B is higher than an upper end of hole 8c as shown with a chain double dotted line in the figure, outside air (air outside water heater 1) which entered drainage water tank 8 through drainage water discharge portion 8h does not come toward drainage water introduction portion 8g. With such a water-seal structure of drainage water tank 8, entry of outside air into water heater 1 through drainage water tank 8 as shown with hollow arrows in the figure can be prevented.

In a bottom portion of space 8A, drainage water outlet port 8i is provided. This drainage water outlet port 8i is provided so as to drain drainage water D within drainage water tank 8 as it is switched to open during maintenance. An internal space in drainage water tank 8 may be filled with a neutralization agent (not shown) for neutralizing acid drainage water.

Referring mainly to FIG. 1, pipes 10a, 10b, and 10d connect this drainage water tank 8 and drainage water drain port 4a of secondary heat exchanger 4 to each other. Drainage water discharge pipe 10b is connected to drainage water drain port 4a of secondary heat exchanger 4 in order to discharge drainage water within secondary heat exchanger 4 to the outside. Tank connection pipe 10a is connected to drainage water introduction portion 8g (FIG. 5) of drainage water tank 8. A Y-shaped pipe joint (a pipe connection portion) 10d is connected to both of drainage water discharge pipe 10b and tank connection pipe 10a so as to connect drainage water discharge pipe 10b and tank connection pipe 10a to each other.

One end of air passage pipe 10c is connected to a pipe connection portion 5aa of exhaust box 5, and the other end of air passage pipe 10c is connected to Y-shaped pipe joint 10d. Namely, air passage pipe 10c is connected between Y-shaped pipe joint 10d and exhaust box 5. Y-shaped pipe joint 10d has a flow path allowing merging of air passage pipe 10c and drainage water discharge pipe 10b and it is constructed such that the flow path after merging leads to the outside of water heater 1 through tank connection pipe 10a and drainage water tank 8.

Thus, tank connection pipe 10a, drainage water discharge pipe 10b, air passage pipe 10c, and Y-shaped pipe joint 10d constitute pipe 10 for drainage water and air, which is branched from drainage water tank 8 and connected to both of secondary heat exchanger 4 and exhaust box 5.

Drainage water discharge pipe 10b preferably extends horizontally or as being downwardly inclined from drainage water drain port 4a to Y-shaped pipe joint 10d. Thus, drainage water can smoothly flow from secondary heat exchanger 4 toward drainage water tank 8.

Referring mainly to FIGS. 1 and 5, drainage water discharge piping 15 is connected to drainage water discharge portion 8h (FIG. 5) of drainage water tank 8 and leads to the outside of water heater 1 (FIG. 1). Drainage water outlet piping 16 is connected to drainage water outlet port 8i (FIG. 5) of drainage water tank 8 and leads to the outside of water heater 1 (FIG. 1).

Referring mainly to FIG. 1, water supply pipe 12 is connected to one end of heat conduction pipe 4b of secondary heat exchanger 4 and hot water delivery pipe 13 is connected to one end of heat conduction pipe 3a of primary heat exchanger 3. The other end of heat conduction pipe 3a of primary heat exchanger 3 and the other end of heat conduction pipe 4b of secondary heat exchanger 4 are connected to each other through connection pipe 14. Each of gas supply pipe 11, water supply pipe 12, and hot water delivery pipe 13 leads to the outside, for example, in a top portion of water heater 1. Burner 2, primary heat exchanger 3, secondary heat exchanger 4, exhaust box 5, fan 6, and drainage water tank 8 are arranged in housing 9.

A function and effect of the water heater in the present embodiment will now be described in comparison with a comparative example shown in FIG. 6.

Figure 6:
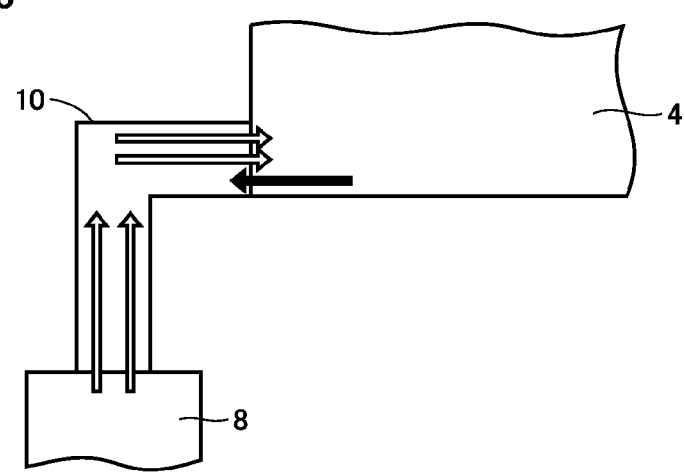
FIG. 6 is a schematic diagram for illustrating low discharge ability of drainage water in a water heater in a comparative example.

Initially, in a water heater in the comparative example shown in FIG. 6, pipe 10 for discharge of drainage water which connects drainage water tank 8 and secondary heat exchanger 4 to each other is not branched. Since the comparative example is otherwise substantially the same as the water heater in the present embodiment described above, description thereof will not be repeated.

Water heater 1 in this comparative example is a water heater adapted to the exhaust suction and combustion system similar to water heater 1 in the present embodiment shown in FIG. 1. In water heater 1 adapted to this system, as shown in FIG. 1, fan 6 is arranged downstream of secondary heat exchanger 4 for recovering latent heat in the flow of combustion gas. Therefore, during a period until drainage water tank 8 is water-sealed, air is taken into secondary heat exchanger 4 from the outside of water heater 1 through a drainage water discharge path (drainage water discharge piping 15, drainage water tank 8, tank connection pipe 10*a*, Y-shaped pipe joint 10*d*, and drainage water discharge pipe 10*b*).

Therefore, as shown in FIG. 6, a direction of flow of air within pipe 10 for discharge of drainage water (hollow arrows in the figure) is reverse to a direction of discharge of drainage water (a black arrow in the figure). Therefore, drainage water is less dischargeable toward drainage water tank 8 through pipe 10 for discharge of drainage water and is likely to stay in secondary heat exchanger 4.

If discharge of drainage water within secondary heat exchanger 4 does not proceed but drainage water is stored, drainage water may run over toward primary heat exchanger 3 through opening portion 4*e* shown in FIG. 2. In this case, overflow drainage water may corrode heat conduction pipe 3*a* of primary heat exchanger 3 composed, for example, of copper, or corrode burner 2 composed, for example, of stainless steel, or extinguish a flame of burner 2.

Figure 7:
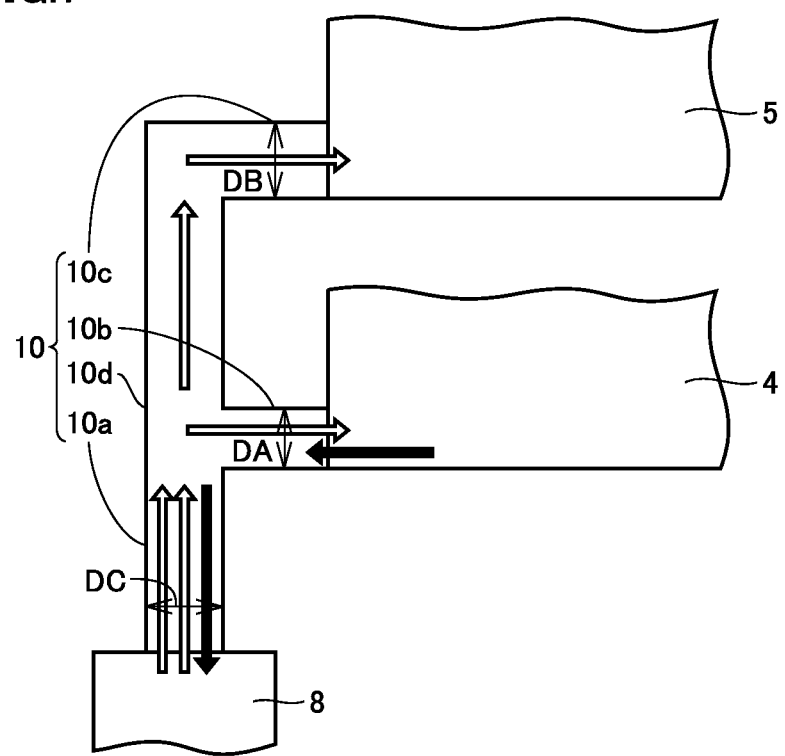
FIG. 7 is a schematic diagram for illustrating ease in discharge of drainage water in the water heater in one embodiment of the present invention.

In contrast, according to water heater 1 in the present embodiment, as shown in p FIG. 7, the other end of pipe 10 having one end connected to drainage water tank 8 is branched and connected to both of secondary heat exchanger 4 and exhaust box 5. Therefore, air which enters water heater 1 from the outside of water heater 1 is diverted to air which enters secondary heat exchanger 4 and air which enters exhaust box 5. Thus, a flow rate of air which enters secondary heat exchanger 4 (air which passes through drainage water discharge pipe 10*b*) can be lower than a flow rate in tank connection pipe 10*a*. Therefore, discharge of drainage water toward drainage water tank 8 through drainage water discharge pipe 10*b* is facilitated and drainage water is less likely to stay in secondary heat exchanger 4.

As shown in FIG. 1, air passage pipe 10*c* is connected to exhaust box 5. This exhaust box 5 is located closer to fan 6 than secondary heat exchanger 4. Therefore, a negative pressure in the internal space in exhaust box 5 is higher than in the internal space in secondary heat exchanger 4. Thus, since an amount of air which enters secondary heat exchanger 4 can be smaller than an amount of air which enters exhaust box 5, discharge of drainage water through drainage water discharge pipe 10*b* is further facilitated and drainage water is less likely to stay in secondary heat exchanger 4.

Since water heater 1 adapted to the exhaust suction and combustion system is employed as described above in the present embodiment, a combustion operation by burner 2 can be stabilized as compared with a water heater of what is called a forced exhaust type even though exhaust tube 7 is decreased in diameter, which will be described below.

In a water heater of what is called a forced exhaust type, a fan, a burner, a primary heat exchanger, and a secondary heat exchanger are arranged in this order from upstream to downstream in a flow of combustion gas. Namely, combustion gas produced in the burner is caused to flow into an exhaust tube outside the water heater by the fan through the primary heat exchanger and the secondary heat exchanger.

Combustion gas forced out of the fan receives flow path resistance produced by the primary heat exchanger and the secondary heat exchanger before it reaches the exhaust tube. Therefore, a pressure with which combustion gas is sent immediately before the exhaust tube is lower by magnitude comparable to this flow path resistance. Therefore, in order to force combustion gas into the exhaust tube smaller in diameter, a fan blow pressure should be raised. When a fan blow pressure is raised, however, an internal pressure within a burner case becomes higher. Therefore, when a supply pressure of combustion gas supplied to the burner is low, a combustion operation becomes unstable.

In contrast, according to the exhaust suction and combustion system in the present embodiment, burner 2, primary heat exchanger 3, secondary heat exchanger 4, and fan 6 are arranged in this order from upstream to downstream in the flow of combustion gas. With this system, since a pressure is negative on the upstream side of fan 6, a blow pressure by fan 6 does not have to be raised. Thus, since an internal pressure within the burner case can be maintained low even though exhaust tube 7 is decreased in diameter, a combustion operation can be stabilized even when a supply pressure of combustion gas supplied to burner 2 is low.

As shown in FIG. 7, in water heater 1 in the present embodiment, an inner diameter DB of air passage pipe 10*c* is preferably set to be larger than an inner diameter DA of drainage water discharge pipe 10*b* (DB>DA). Thus, air passage pipe 10*c* can allow passage of air more than drainage water discharge pipe 10*b*, and a flow rate of air which passes through drainage water discharge pipe 10*b* can be lowered. Therefore, discharge of drainage water through drainage water discharge pipe 10*b* is further facilitated and drainage water is less likely to stay in secondary heat exchanger 4.

As shown in FIG. 7, in the water heater in the present embodiment, an inner diameter DC of tank connection pipe 10*a* is preferably set to be larger than inner diameter DA of drainage water discharge pipe 10*b* (DC>DA). Thus, only some of air which passes through tank connection pipe 10*a* flows into drainage water discharge pipe 10*b*. Therefore, a flow rate of air which passes through drainage water discharge pipe 10*b* can be lowered, discharge of drainage water through drainage water discharge pipe 10*b* is facilitated, and drainage water is less likely to stay in secondary heat exchanger 4.

Figure 8:
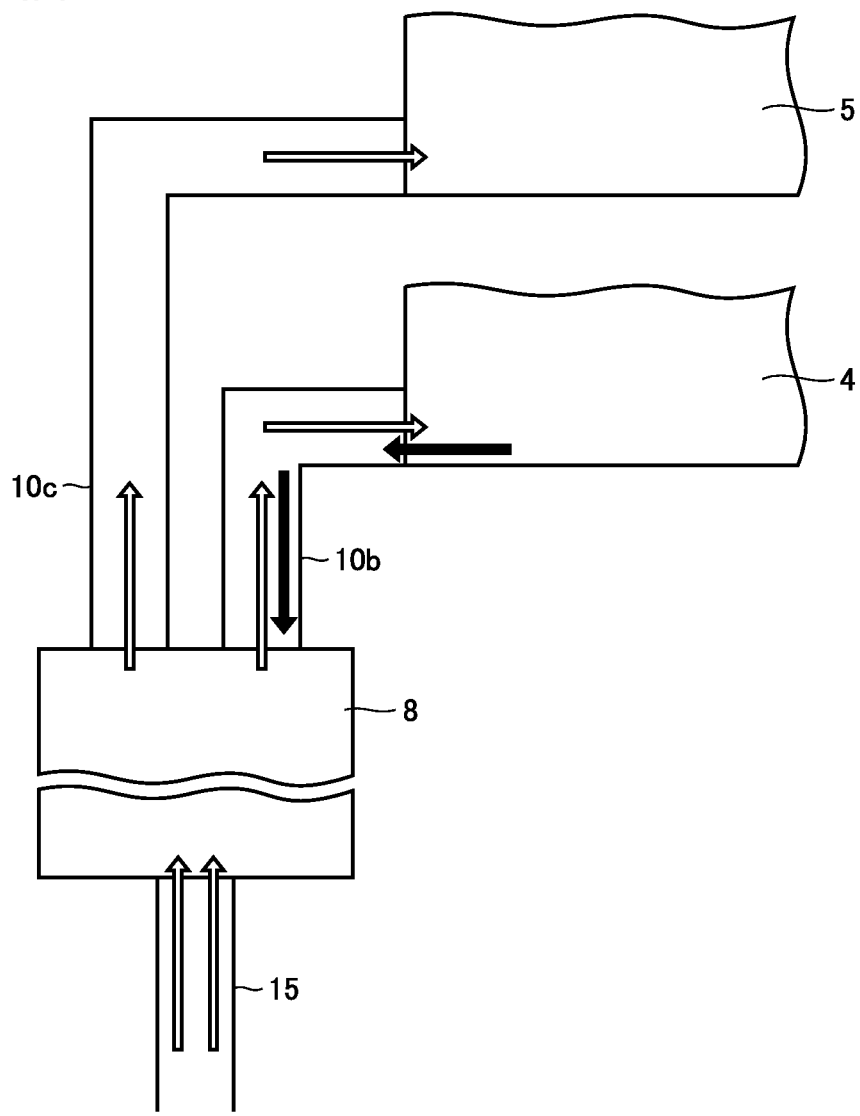
FIG. 8 is a schematic diagram for illustrating ease in discharge of drainage water in the water heater in another embodiment of the present invention.

As shown in FIG. 8, drainage water discharge pipe 10*b* and air passage pipe 10*c* may be connected to common drainage water tank 8 as being separate from each other. Namely, drainage water tank 8 may serve as a pipe connection portion allowing merging of drainage water discharge pipe 10*b* and air passage pipe 10*c*.

Thus, when drainage water discharge pipe 10*b* and air passage pipe 10*c* are merged with each other in drainage water tank 8 as well, air which enters the inside of water heater 1 from the outside can be diverted to both of drainage water discharge pipe 10*b* and air passage pipe 10*c*. Thus, since a flow rate of air which passes through drainage water discharge pipe 10*b* can be lowered, discharge of drainage water through drainage water discharge pipe 10*b* is facilitated and drainage water is less likely to stay in secondary heat exchanger 4. By directly connecting each of drainage water discharge pipe 10*b* and air passage pipe 10*c* to drainage water tank 8, it is not necessary to provide Y-shaped pipe joint 10*d* and tank connection pipe 10*a* shown in FIG. 1. The number of parts can thus be reduced and a construction can be simplified.

In the construction shown in FIG. 1, though air passage pipe 10*c* is connected to box main body 5*a* of exhaust box 5, air passage pipe 10*c* should only be connected to a path for flow of combustion gas from secondary heat exchanger 4 until fan 6. Here, the "path for flow of combustion gas from secondary heat exchanger 4 until fan 6" means a space in which combustion gas flows within secondary heat exchanger 4 and exhaust box 5 in FIG. 1. When a constituent member other than exhaust box 5 is provided in between secondary heat exchanger 4 and fan 6, a space in that constituent member in which combustion gas flows is also encompassed.

Figure 9:
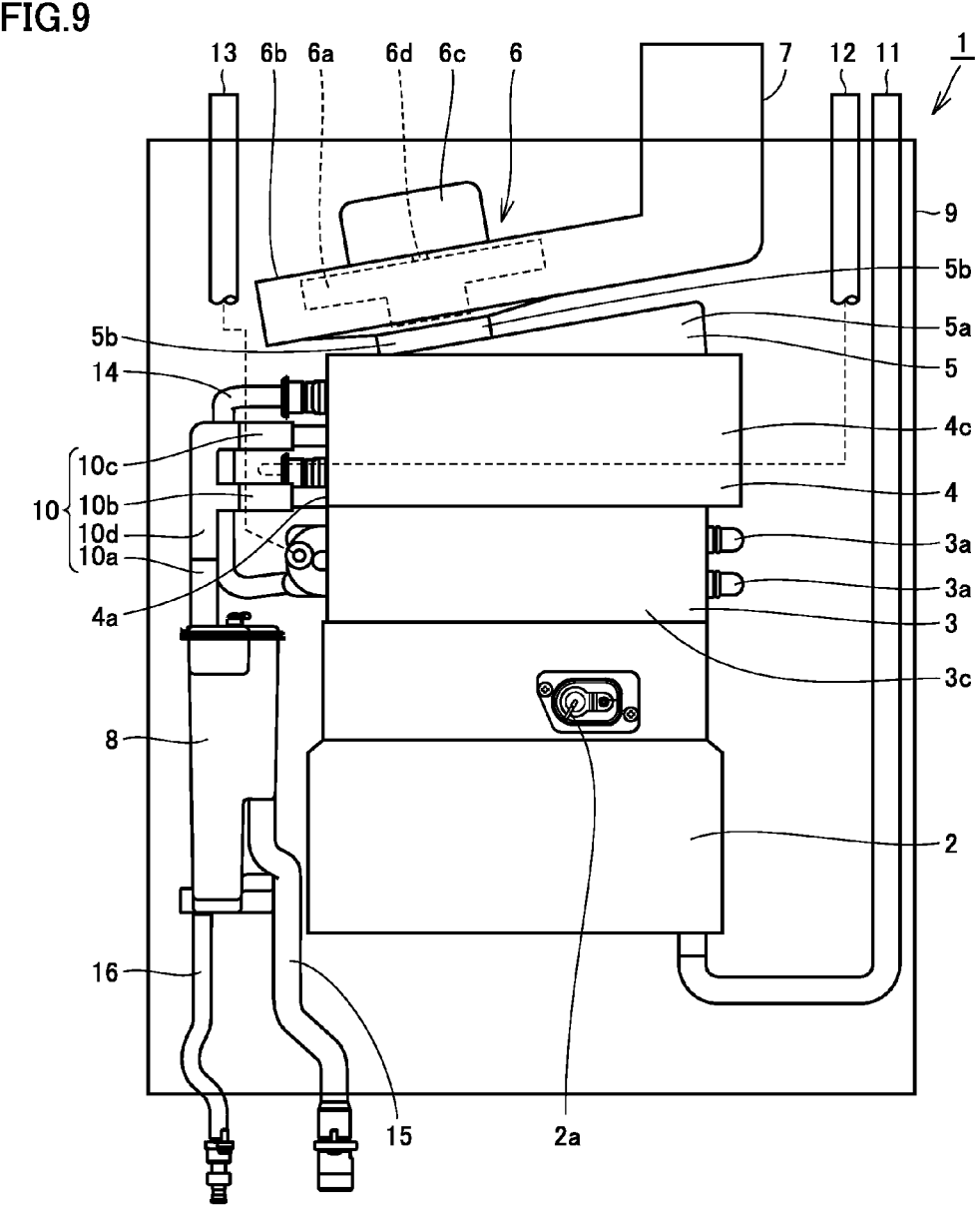
FIG. 9 is a front view schematically showing connection of an air passage pipe to the secondary heat exchanger.

Therefore, as shown in FIG. 9, air passage pipe 10*c* may be connected to secondary heat exchanger 4 instead of exhaust box 5. Namely, air passage pipe 10*c* may be connected between pipe connection portion (an F-shaped pipe joint) 10d and secondary heat exchanger 4. When air passage pipe 10c is thus connected to secondary heat exchanger 4 as well, air which enters the inside of water heater 1 from the outside can be diverted to both of drainage water discharge pipe 10b and air passage pipe 10c. Thus, as described above, drainage water is less likely to stay in secondary heat exchanger 4.

As shown in FIG. 9, air passage pipe 10c is preferably connected to secondary heat exchanger 4 at a position closer to fan 6 than drainage water discharge pipe 10b. Thus, air passage pipe 10c can open into a region higher in negative pressure than drainage water discharge pipe 10b. Therefore, a flow rate of air which passes through air passage pipe 10c, of drainage water discharge pipe 10b and air passage pipe 10c, can be higher, and a flow rate of air which passes through drainage water discharge pipe 10b can further be lowered. Thus, discharge of drainage water through drainage water discharge pipe 10b is further facilitated.

In the construction in FIG. 9, though F-shaped pipe joint 10d is employed as the pipe connection portion, a Y-shaped pipe joint may be employed as the pipe connection portion. Though Y-shaped pipe joint 10d is employed as the pipe connection portion in the construction in FIG. 1 described above and constructions in FIGS. 10 to 15 which will be described later, an F-shaped pipe joint may be employed as the pipe connection portion.

Figure 10:
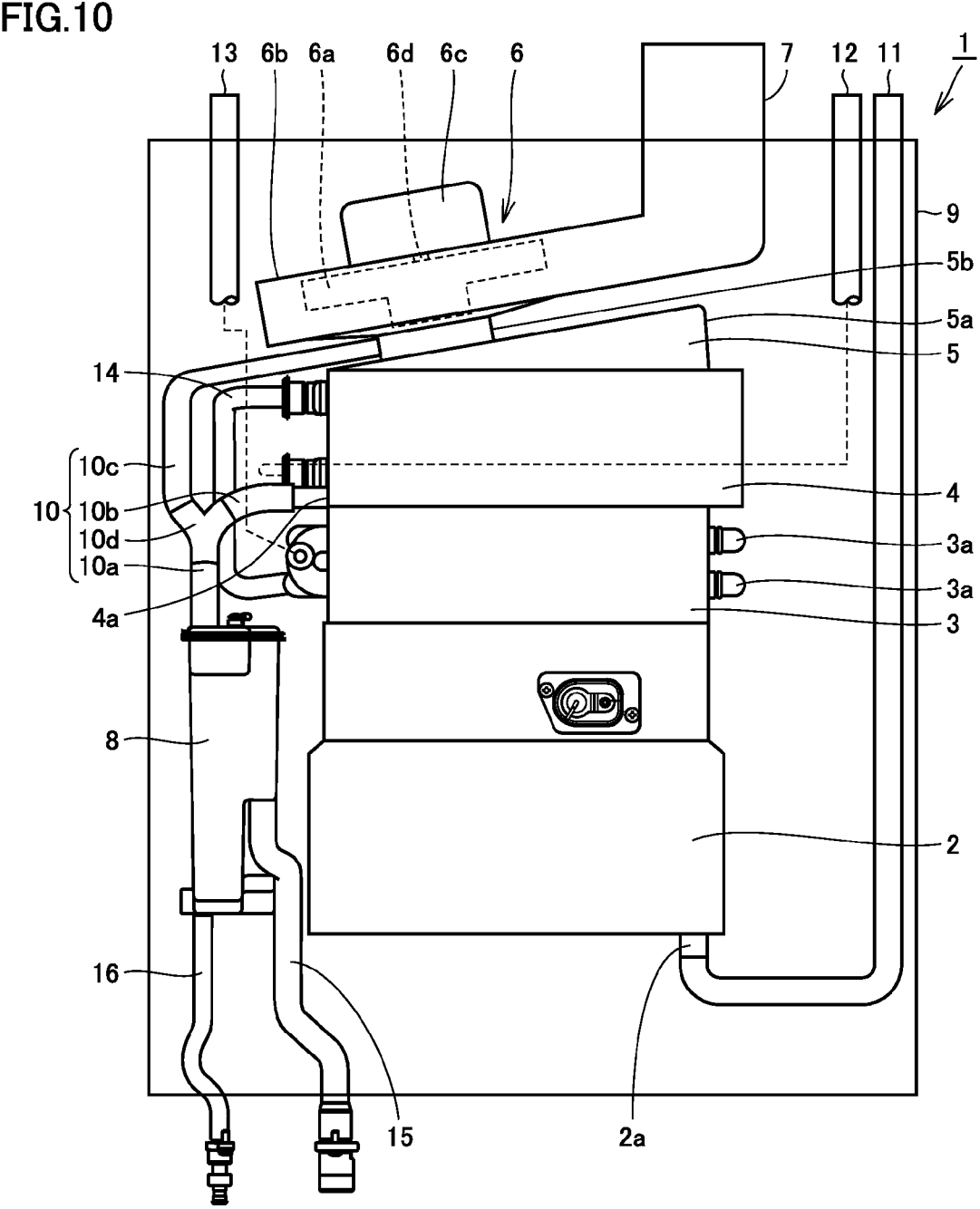
FIG. 10 is a front view schematically showing connection of the air passage pipe to a connection portion connecting an exhaust box and the fan to each other.

As shown in FIG. 10, air passage pipe 10c may be connected to fan connection portion 5b instead of box main body 5a of exhaust box 5. By thus connecting air passage pipe 10c to fan connection portion 5b of exhaust box 5, the air passage pipe can be connected to exhaust box 5 at a position closer to fan 6 than in the case that the air passage pipe is connected to box main body 5a.

Thus, air passage pipe 10c can open into a region higher in negative pressure than in the case that the air passage pipe is connected to box main body 5a. Therefore, a flow rate of air which passes through air passage pipe 10c, of drainage water discharge pipe 10b and air passage pipe 10c, can be higher, and a flow rate of air which passes through drainage water discharge pipe 10b can further be lowered. Therefore, discharge of drainage water through drainage water discharge pipe 10b is further facilitated.

Referring to FIG. 4, air passage pipe 10c preferably opens into a region R opposed to blade 6a in a direction of an axis line A-A of rotation shaft 6d (a hatched region in the figure) in the path for flow of combustion gas from secondary heat exchanger 4 until fan 6. Specifically, air passage pipe 10c preferably opens into region R which is combination of an internal space 5ba in fan connection portion 5b and a region formed by extending that internal space 5ba in the direction of axis line A-A of rotation shaft 6d (a hatched region in the figure).

Since this region R is a region opposed to blade 6a of fan 6 which suctions combustion gas, it is a region high in negative pressure. Therefore, as air passage pipe 10c opens into this region R, a flow rate of air which is taken into water heater 1 through air passage pipe 10c can be made higher, and accordingly, a flow rate of air which passes through the drainage water discharge pipe can further be lowered. Therefore, discharge of drainage water through the drainage water discharge pipe is further facilitated.

For example, as shown in FIG. 10, by connecting air passage pipe 10c to fan connection portion 5b of exhaust box 5, air passage pipe 10c can open into region R high in negative pressure above.

Figure 11:
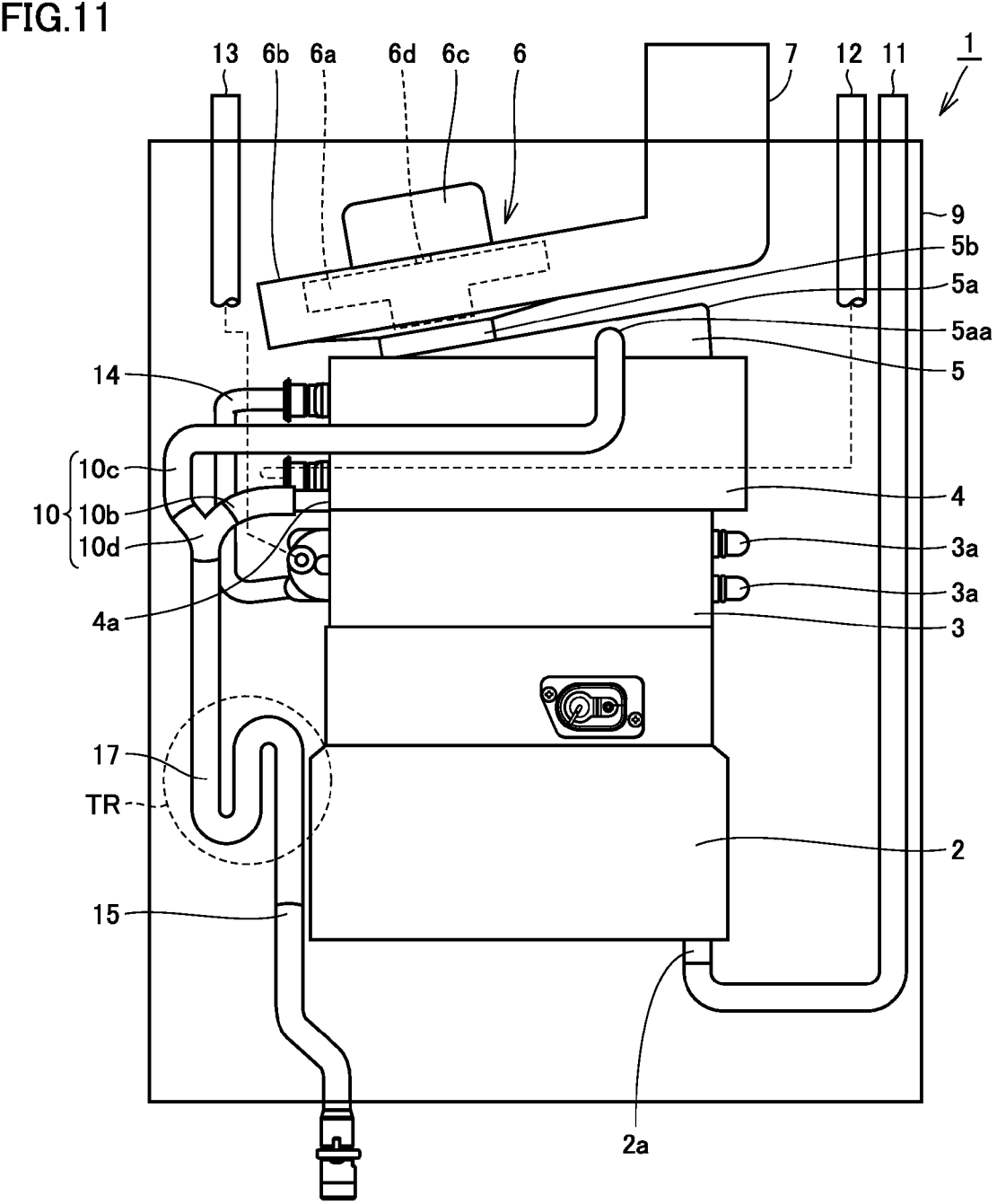
FIG. 11 is a front view schematically showing a construction in which no drainage water tank is provided and a drainage water discharge pipe and the air passage pipe are connected to a trap pipe after they are merged with each other.

As shown in FIG. 11, instead of the drainage water tank and the tank connection pipe, a trap pipe 17 having a drain trap TR which can water-seal a flow path with drainage water may be connected between Y-shaped pipe joint 10d and drainage water discharge piping 15. When drainage water discharge pipe 10b and air passage pipe 10c are merged with each other in trap pipe 17 with the drainage water tank being thus omitted as well, air which enters the inside of water heater 1 from the outside can be diverted to both of drainage water discharge pipe 10b and air passage pipe 10c. Since a flow rate of air which passes through drainage water discharge pipe 10b can thus be lowered, discharge of drainage water through drainage water discharge pipe 10b is facilitated and drainage water is less likely to stay in secondary heat exchanger 4.

As shown in FIGS. 12 to 15, a fan drainage water drain pipe 20 may be connected to fan case 6b. This fan drainage water drain pipe 20 serves to discharge out of fan case 6b, drainage water raised up into fan case 6b and rainwater which entered water heater 1 from outdoors through the exhaust pipe and exhaust tube 7. This fan drainage water drain pipe 20 is preferably connected to a lowest position (a lowermost position in a vertical direction in a state that water heater 1 is placed) in the internal space in fan case 6b. Fan drainage water drain pipe 20 is connected to fan case 6b in a region on the outer circumferential side of blade 6a around rotation shaft 6d of fan 6. Thus, drainage water within fan 6 can be discharged by a positive fan discharge pressure to the outside of fan 6 through fan drainage water drain pipe 20.

Figure 12:
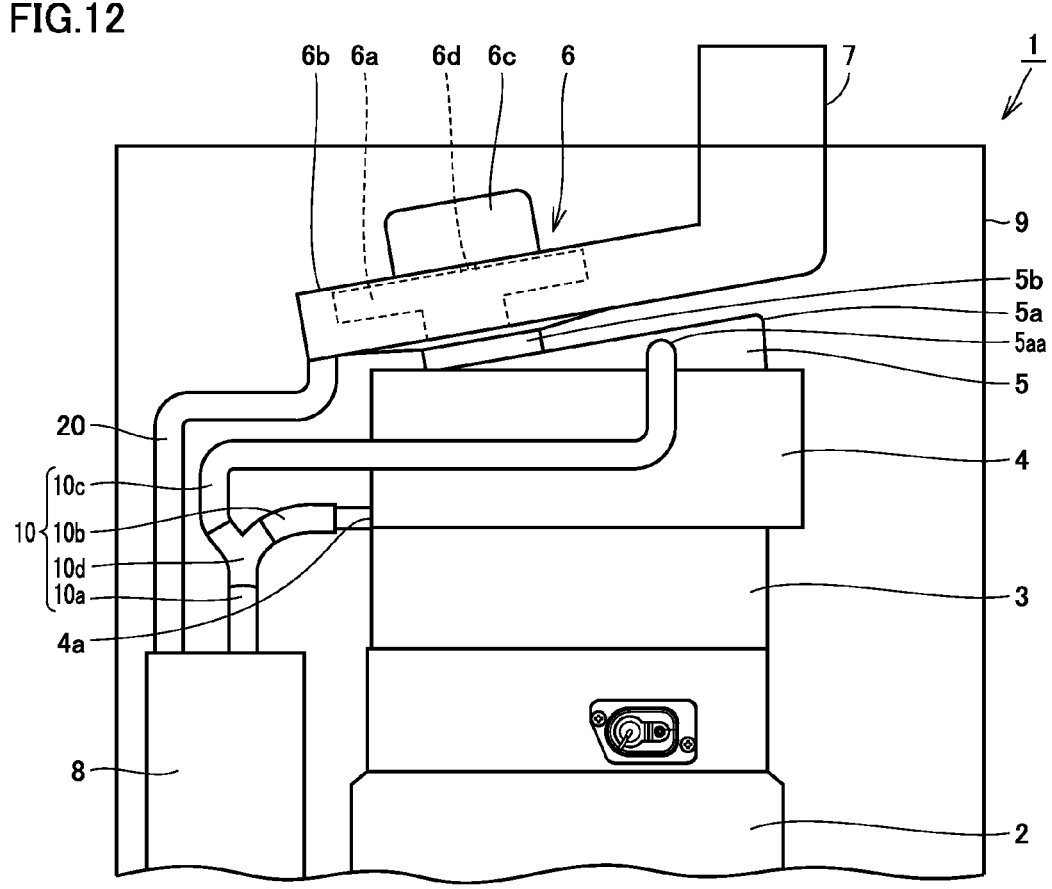
FIG. 12 is a partial front view schematically showing connection of a fan drainage water drain pipe to a fan case.
Figure 13:
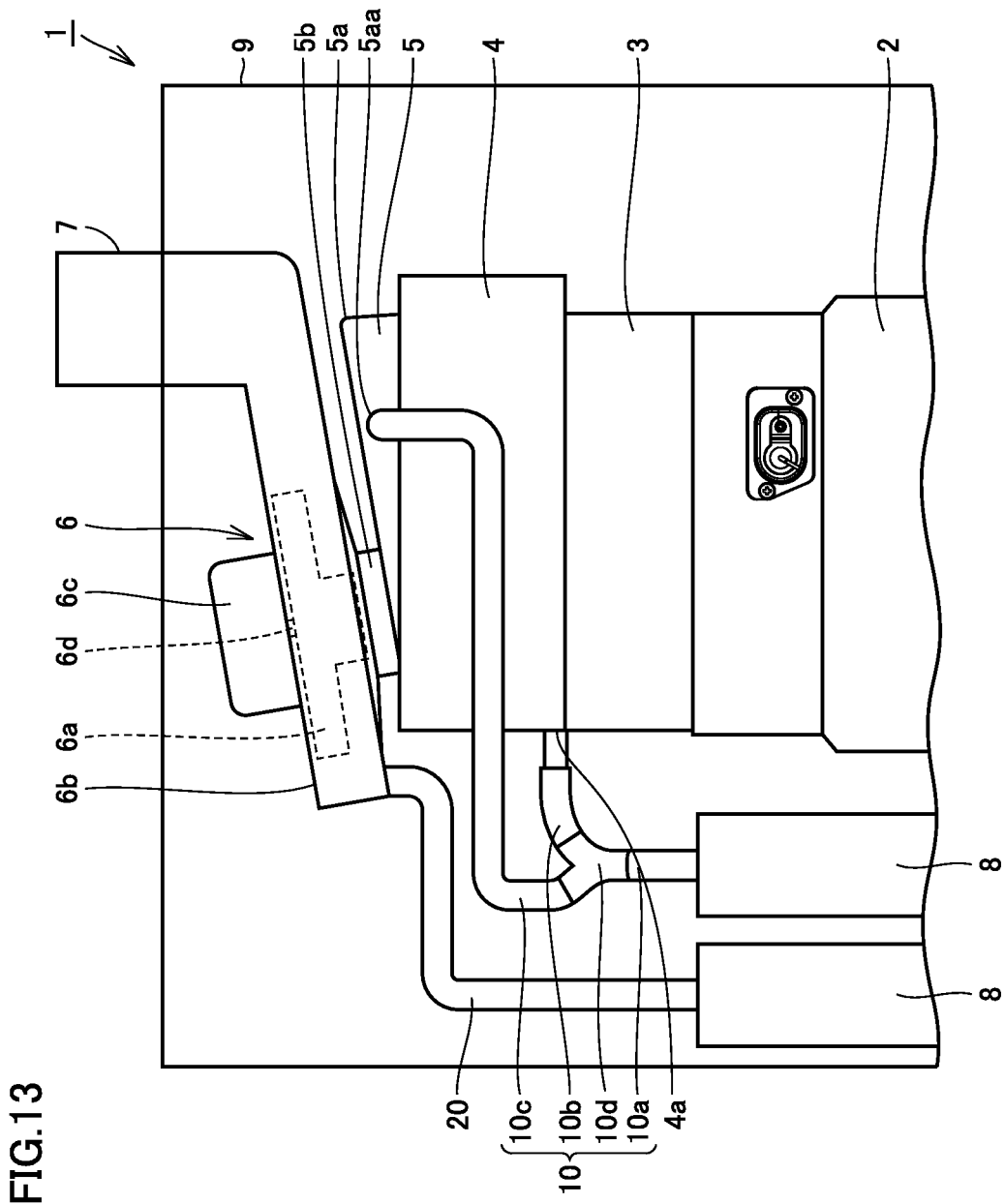
FIG. 13 is a partial front view schematically showing connection of the fan drainage water drain pipe to a drainage water tank different from the drainage water tank to which the drainage water discharge pipe is connected.

As shown in FIGS. 12 and 13, fan drainage water drain pipe 20 may be connected between fan case 6b and drainage water tank 8. Drainage water tank 8 to which fan drainage water drain pipe 20 is connected may be the same as drainage water tank 8 storing drainage water in secondary heat exchanger 4 as shown in FIG. 12 or may be different from drainage water tank 8 storing drainage water in secondary heat exchanger 4 as shown in FIG. 13.

Figure 14:
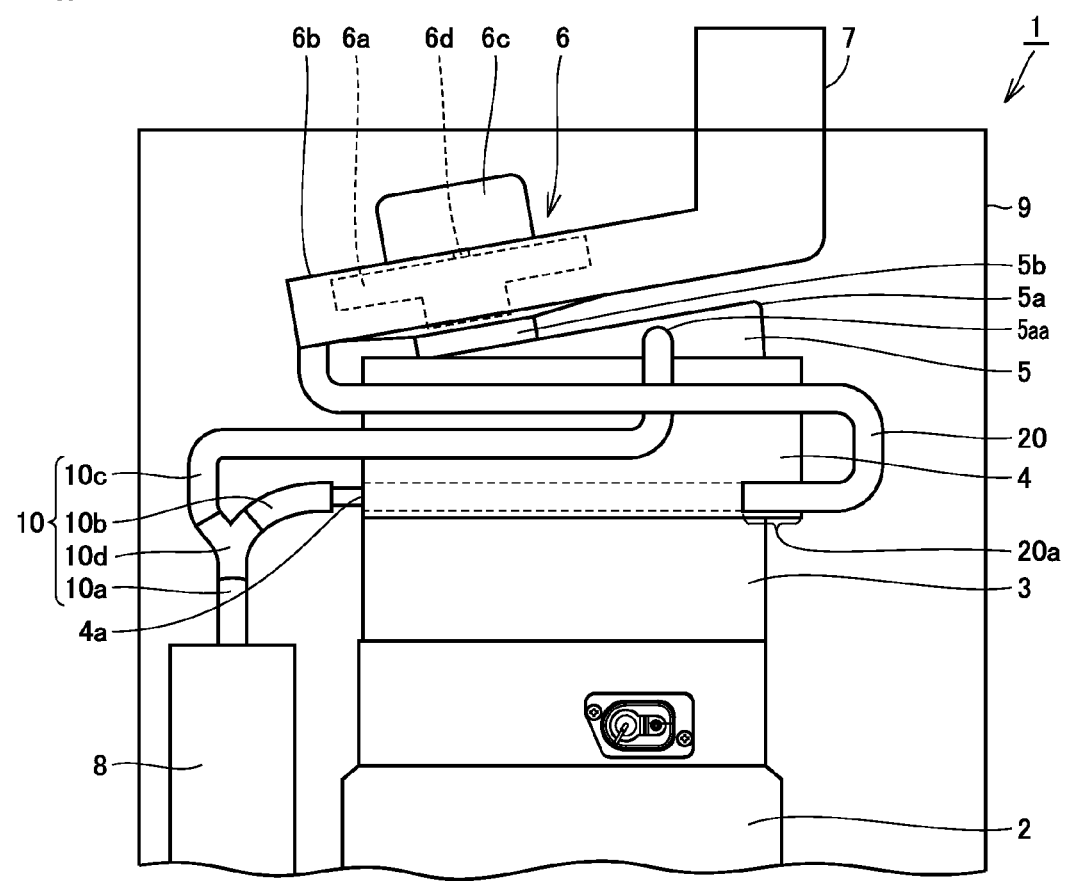
FIG. 14 is a partial front view schematically showing connection of the fan drainage water drain pipe to the secondary heat exchanger.

Fan drainage water drain pipe 20 may be connected between fan case 6b and secondary heat exchanger 4 as shown in FIG. 14. In this construction, drainage water within fan case 6b once enters secondary heat exchanger 4 through fan drainage water drain pipe 20 and thereafter it is stored in drainage water tank 8, together with drainage water produced in secondary heat exchanger 4, through drainage water discharge pipe 10b.

In this construction, a connection portion of fan drainage water drain pipe 20 to secondary heat exchanger 4 and drainage water drain port 4a are preferably opposed to each other in a direction of width (a lateral direction in FIG. 14) of water heater 1. Specifically, drainage water drain port 4a (an opening of secondary heat exchanger 4 to which drainage water discharge pipe 10b is connected) is preferably located in a virtual region (a region between dashed lines shown in secondary heat exchanger 4) extended in a direction of extension of a portion 20a of fan drainage water drain pipe 20 within secondary heat exchanger 4.

Within fan drainage water drain pipe 20, a pressure is applied in a direction of discharge of drainage water from fan case 6b as blade 6a rotates. Therefore, by causing the connection portion of fan drainage water drain pipe 20 to secondary heat exchanger 4 to face drainage water drain port 4a, an air current from the connection portion of fan drainage water drain pipe 20 toward drainage water drain port 4a can be produced. This air current can promote discharge of drainage water within secondary heat exchanger 4 to drainage water discharge pipe 10b.

Figure 15:
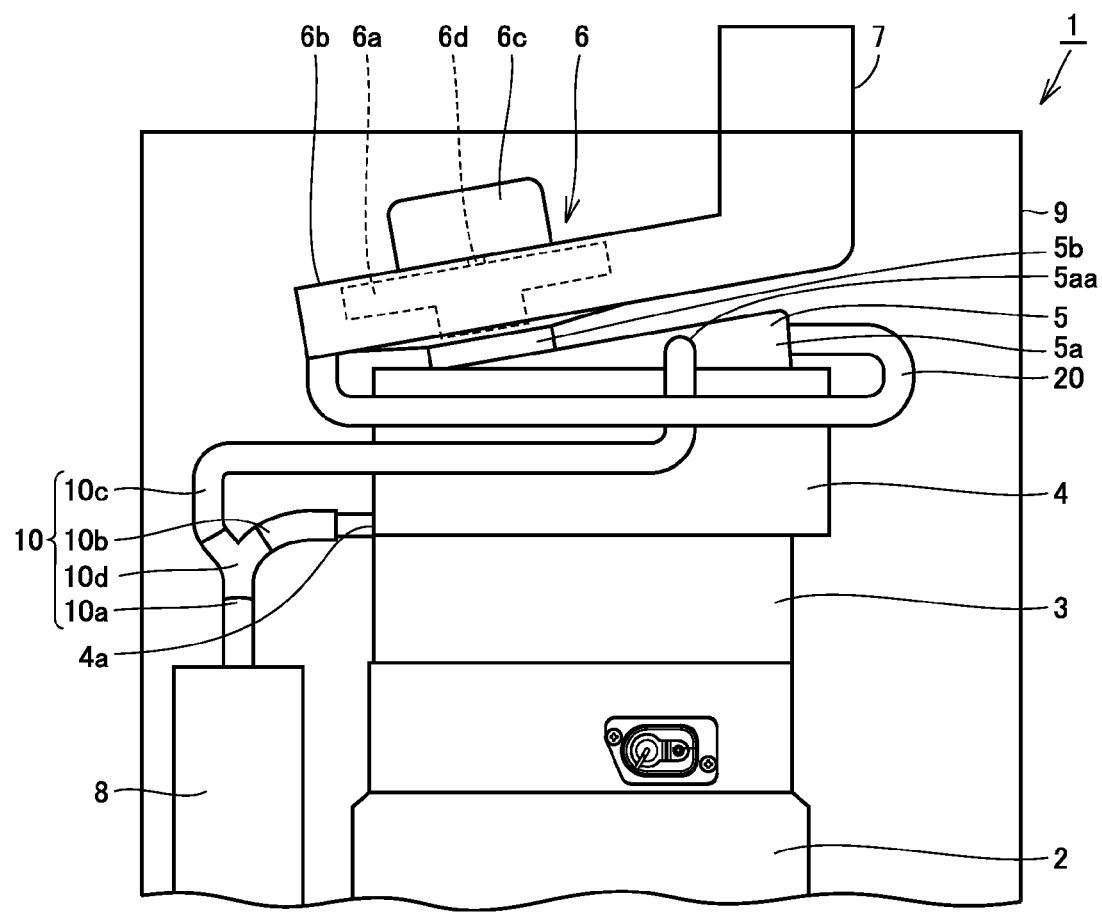
FIG. 15 is a partial front view schematically showing connection of the fan drainage water drain pipe to the exhaust box.

As shown in FIG. 15, fan drainage water drain pipe 20 may be connected between fan case 6b and exhaust box 5. In this construction, drainage water within fan case 6b once enters secondary heat exchanger 4 through fan drainage water drain pipe 20 via exhaust box 5, and is stored in drainage water tank 8 through drainage water discharge pipe 10*b*, together with drainage water produced within secondary heat exchanger 4.

Though fan drainage water drain pipe 20 is shown to be connected to exhaust box 5 after it bends upward from below for the sake of convenience of illustration in FIG. 15, fan drainage water drain pipe 20 preferably extends horizontally or as being downwardly inclined from fan case 6*b* until exhaust box 5. Drainage water can thus smoothly flow from fan case 6*b* to exhaust box 5.

Figure 16:
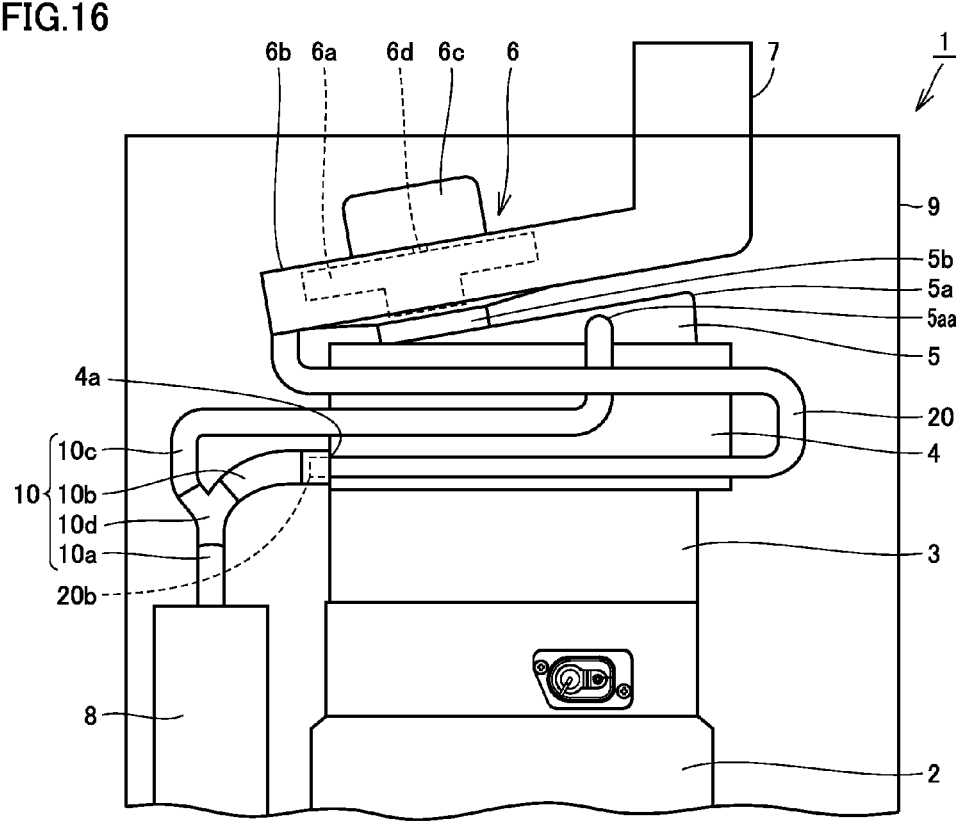
FIG. 16 is a partial front view schematically showing a part of the fan drainage water drain pipe within the secondary heat exchanger at least reaching a drainage water drain port.

As shown in FIG. 16, an end portion 20*b* of fan drainage water drain pipe 20 on the side of secondary heat exchanger 4 preferably at least reaches drainage water drain port 4*a* of secondary heat exchanger 4 which leads to drainage water discharge pipe 10*b*. End portion 20*b* of fan drainage water drain pipe 20 is preferably inserted into the pipe from drainage water drain port 4*a* toward drainage water discharge pipe 10*b*.

Thus, some of the exhaust gas, together with drainage water, can be blown through fan drainage water drain pipe 20 owing to a discharge pressure by fan 6. Therefore, discharge of drainage water within secondary heat exchanger 4 to the outside of secondary heat exchanger 4 through drainage water discharge pipe 10*b* can be promoted.

Figure 17:
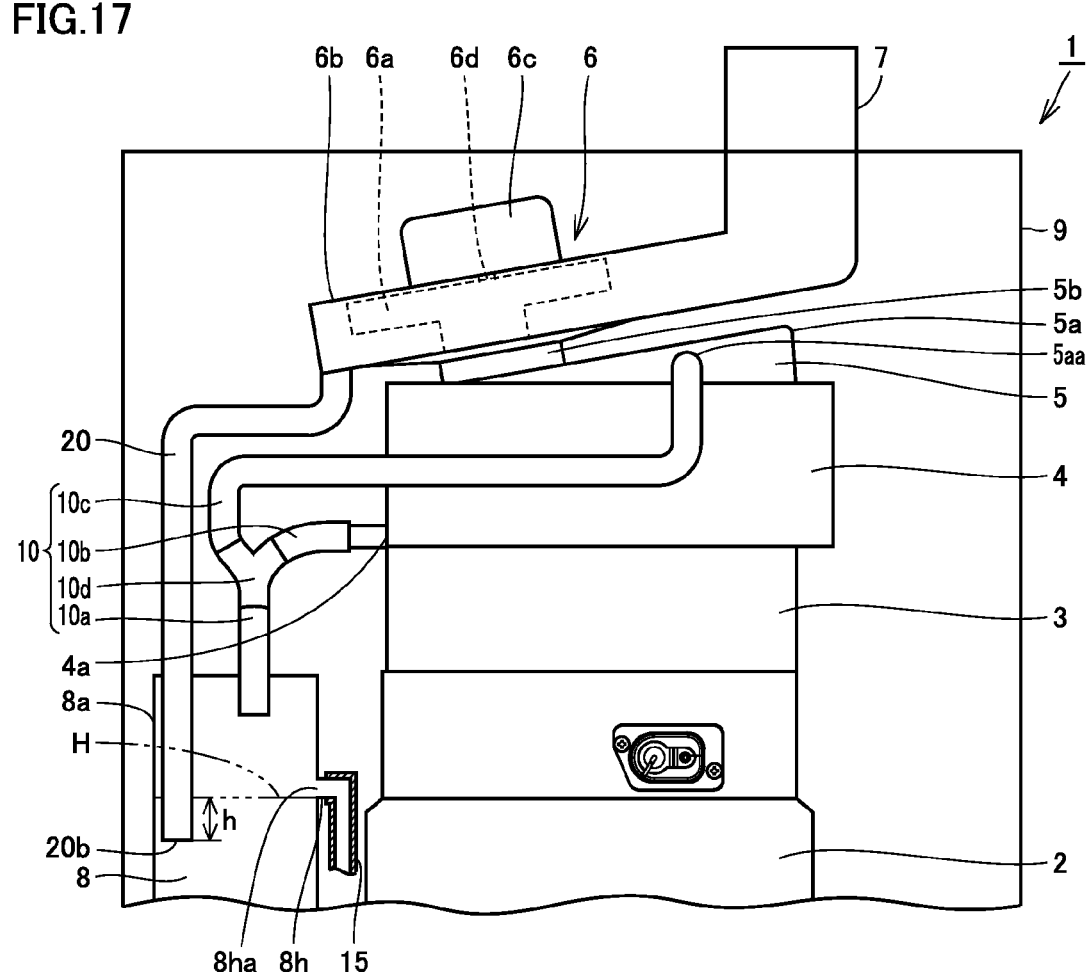
FIG. 17 is a partial front view schematically showing connection of the fan drainage water drain pipe to the drainage water tank.

As shown in FIG. 17, fan drainage water drain pipe 20 may be connected between fan 6 and drainage water tank 8. In this construction, fan drainage water drain pipe 20 is connected to drainage water tank 8 as being separate from tank connection pipe 10*a*, drainage water discharge pipe 10*b*, and air passage pipe 10*c*. Drainage water within fan 6 can thus effectively be discharged into drainage water tank 8 owing to a fan discharge pressure.

Opening 20*b* of fan drainage water drain pipe 20 within drainage water tank 8 is preferably located at a height lower than a height position H (a position shown with a triple chain dotted line in FIG. 17) of a lower end portion of a drainage water discharge opening 8*ha* which leads to drainage water discharge portion 8*h* provided in drainage water storage portion 8*a* (see FIG. 5) of drainage water tank 8.

Since air within fan 6 is blown through fan drainage water drain pipe 20 by connecting fan drainage water drain pipe 20 to fan 6, efficiency in exhaust by fan 6 may be lowered. Then, opening 20*b* of fan drainage water drain pipe 20 within drainage water tank 8 is arranged at a position lower than height position H of the lower end portion of drainage water discharge opening 8*ha*. Thus, when drainage water is stored in drainage water tank 8 and drainage water tank 8 is filled, opening 20*b* of fan drainage water drain pipe 20 is immersed in drainage water and air within fan 6 is less likely to escape through fan drainage water drain pipe 20 into drainage water tank 8. Therefore, lowering in fan efficiency due to escape of air within fan 6 through fan drainage water drain pipe 20 can be suppressed.

A distance h in a direction of height between height position H of the lower end portion of drainage water discharge opening 8*ha* and the height position of opening 20*b* of fan drainage water drain pipe 20 within drainage water tank 8 is preferably 80 mm or greater.

A fan discharge pressure is normally from 80 mm $H_2O$ to 100 mm $H_2O$ (784.532 Pa to 980.665 Pa). Therefore, by setting distance h to 80 mm or greater, a head (a pressure head) of drainage water within fan drainage water drain pipe 20 can be equal to or higher than a fan discharge pressure (80 mm $H_2O$) when drainage water is stored within drainage water tank 8 and drainage water tank 8 is filled. Therefore, escape of air within fan 6 through fan drainage water drain pipe 20 into drainage water tank 8 and bubbling of drainage water stored within drainage water tank 8 can be prevented.

From a point of view of prevention of leakage of air within fan 6 into drainage water tank 8, distance h in the direction of height between height position H of the lower end portion of drainage water discharge opening 8*ha* and the height position of opening 20*b* of fan drainage water drain pipe 20 is more preferably 100 mm or greater.

Figure 18:
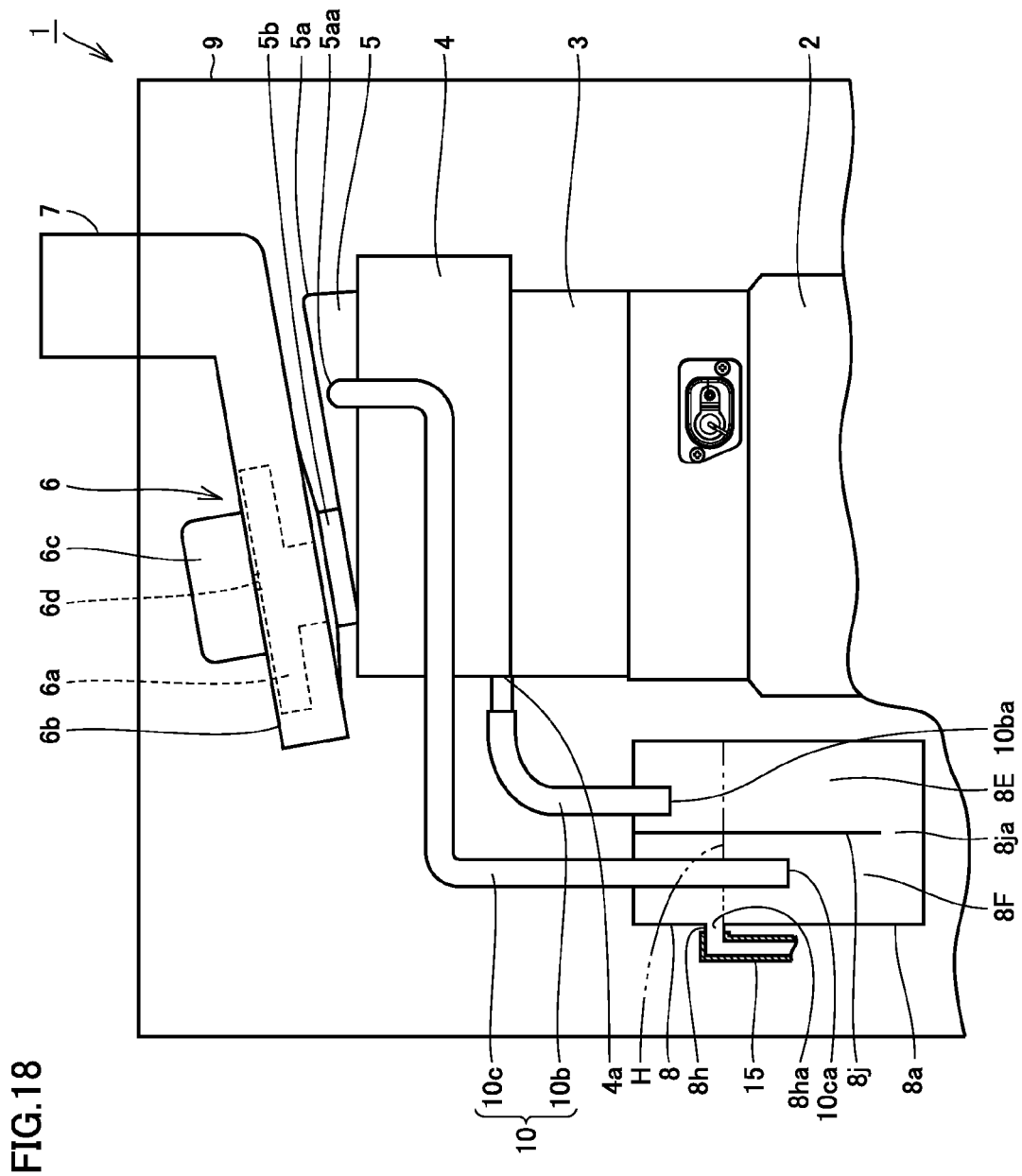
FIG. 18 is a partial front view schematically showing connection of the air passage pipe and the drainage water discharge pipe to the drainage water tank as being separate from each other.

As shown in FIG. 18, the inside of drainage water storage portion 8*a* of drainage water tank 8 may be partitioned by a partition portion 8*j* into a first space 8E and a second space 8F, drainage water discharge pipe 10*b* may be connected to first space 8E, and air passage pipe 10*c* may be connected to second space 8F.

Partition portion 8*j* is provided with a communication hole 8*ja* connecting first space 8E and second space 8F to each other. Therefore, drainage water discharged into drainage water tank 8 through drainage water discharge pipe 10*b* can enter second space 8F through communication hole 8*ja* from first space 8E. A level of drainage water stored in first and second spaces 8E and 8F will be higher with increase in amount of stored drainage water, and when the level reaches height position H of the lower end of drainage water discharge opening 8*ha*, drainage water can be discharged to the outside of drainage water tank 8 through drainage water discharge opening 8*ha*. Thus, second space 8F is located downstream of first space 8E in a drainage water discharge path within drainage water tank 8.

An opening 10*ca* of air passage pipe 10*c* within drainage water tank 8 is arranged at a height position lower than height position H of the lower end portion of drainage water discharge opening 8*ha* which leads to drainage water discharge portion 8*h* provided in drainage water storage portion 8*a*.

As described above, in drainage water tank 8, partition portion 8*j* serves as the partition between first space 8E into which drainage water discharge pipe 10*b* opens and second space 8F into which air passage pipe 10*c* opens, and second space 8F is located downstream of first space 8E in the drainage water discharge path. Therefore, before water-sealing of drainage water tank 8, air outside water heater 1 is preferentially taken into air passage pipe 10*c* closer to drainage water discharge opening 8*ha* than drainage water discharge pipe 10*b*. Thus, since air outside water heater 1 is less likely to be taken into drainage water discharge pipe 10*b*, discharge of drainage water to drainage water tank 8 through drainage water discharge pipe 10*b* is facilitated.

By decreasing an area of communication hole 8*ja* in partition portion 8*j* serving as the partition between first space 8E and second space 8F, resistance can be provided to a flow of air which enters first space 8E from second space 8F through communication hole 8*ja*. Since an amount of air which enters first space 8E from second space 8F can thus be decreased, air outside water heater 1 is further less likely to be taken into drainage water discharge pipe 10*b* and discharge of drainage water into drainage water tank 8 through drainage water discharge pipe 10*b* is further facilitated.

An area of opening of this communication hole 8*ja* is preferably, for example, not greater than a pipe inner area of drainage water discharge pipe 10*b*.

Opening 10*ca* of air passage pipe 10*c* is located at the height position lower than height position H of the lower end portion of drainage water discharge opening 8*ha*. Therefore, while drainage water tank 8 is filled with drainage water, opening 10*ca* of air passage pipe 10*c* is blocked and water-sealed by drainage water. Thus, after drainage water tank 8 is filled, unnecessary air will not be taken into air passage pipe 10c from the outside of water heater 1, and fan efficiency can be enhanced.

Though the construction of drainage water tank 8 has been simplified in FIG. 18 for the sake of description, when drainage water tank 8 of a type shown, for example, in FIG. 5 is employed, space 8A within drainage water storage portion 8a corresponds to first space 8E into which drainage water discharge pipe 10b shown in FIG. 18 opens and spaces 8B, 8C, and 8D in FIG. 5 correspond to second space 8F into which air passage pipe 10c shown in FIG. 18 opens. Though air passage pipe 10c may open into any of spaces 8B, 8C, and 8D in FIG. 5, it preferably opens into space 8D from a point of view of closeness to drainage water discharge portion 8h.

The construction including drainage water discharge pipe 10b, air passage pipe 10c, and drainage water tank 8 as shown in FIG. 18 may be applied to the constructions in FIGS. 14 and 16. Applications of the construction including drainage water discharge pipe 10b, air passage pipe 10c, and drainage water tank 8 as shown in FIG. 18 to the constructions in FIGS. 14 and 16 are shown in FIGS. 19 and 20, respectively.

Figure 19:
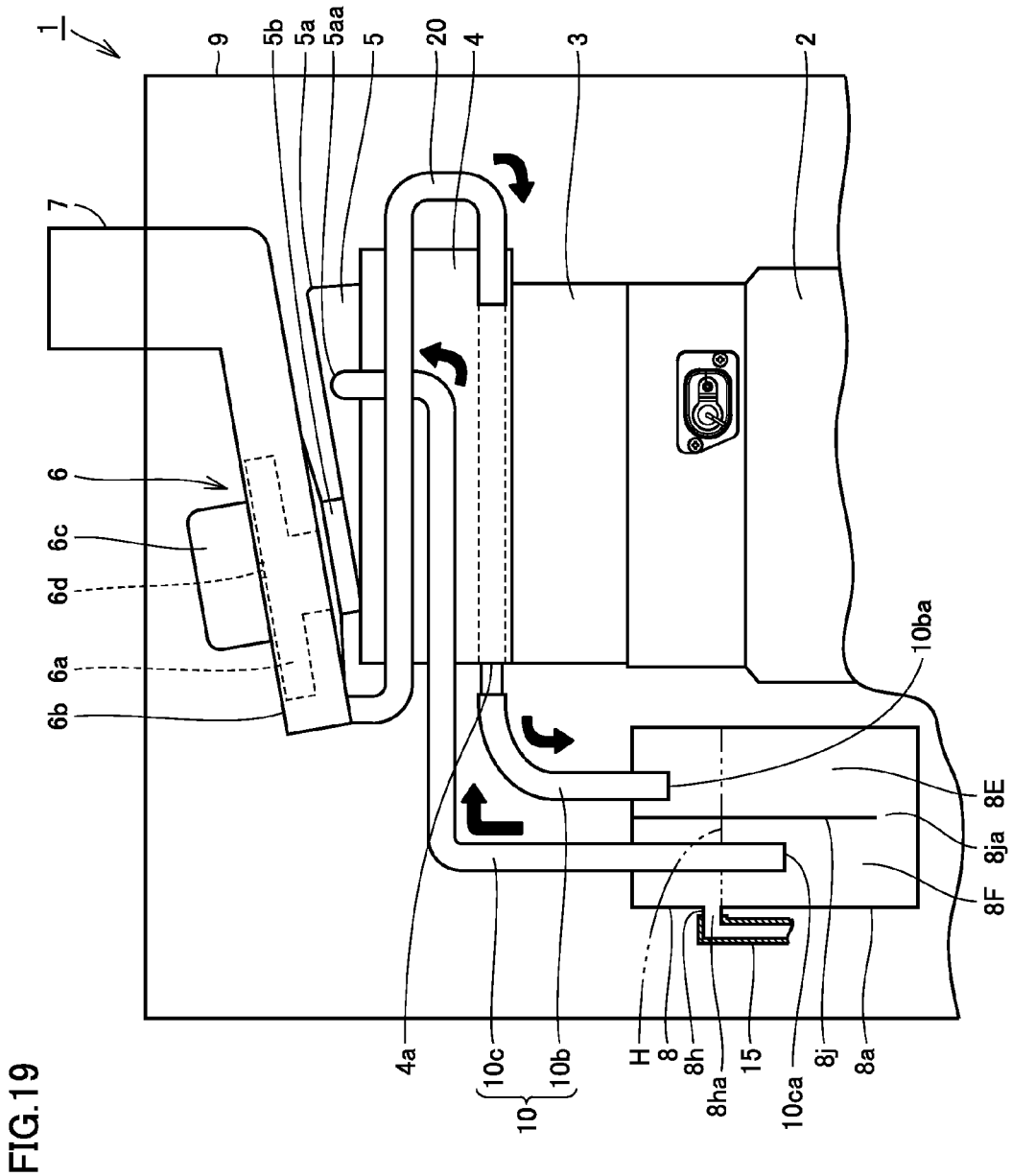
FIG. 19 is a partial front view schematically showing such a construction that the drainage water drain port is located on an extension of the fan drainage water drain pipe within the secondary heat exchanger and the air passage pipe and the drainage water discharge pipe are connected to the drainage water tank as being separate from each other.
Figure 20:
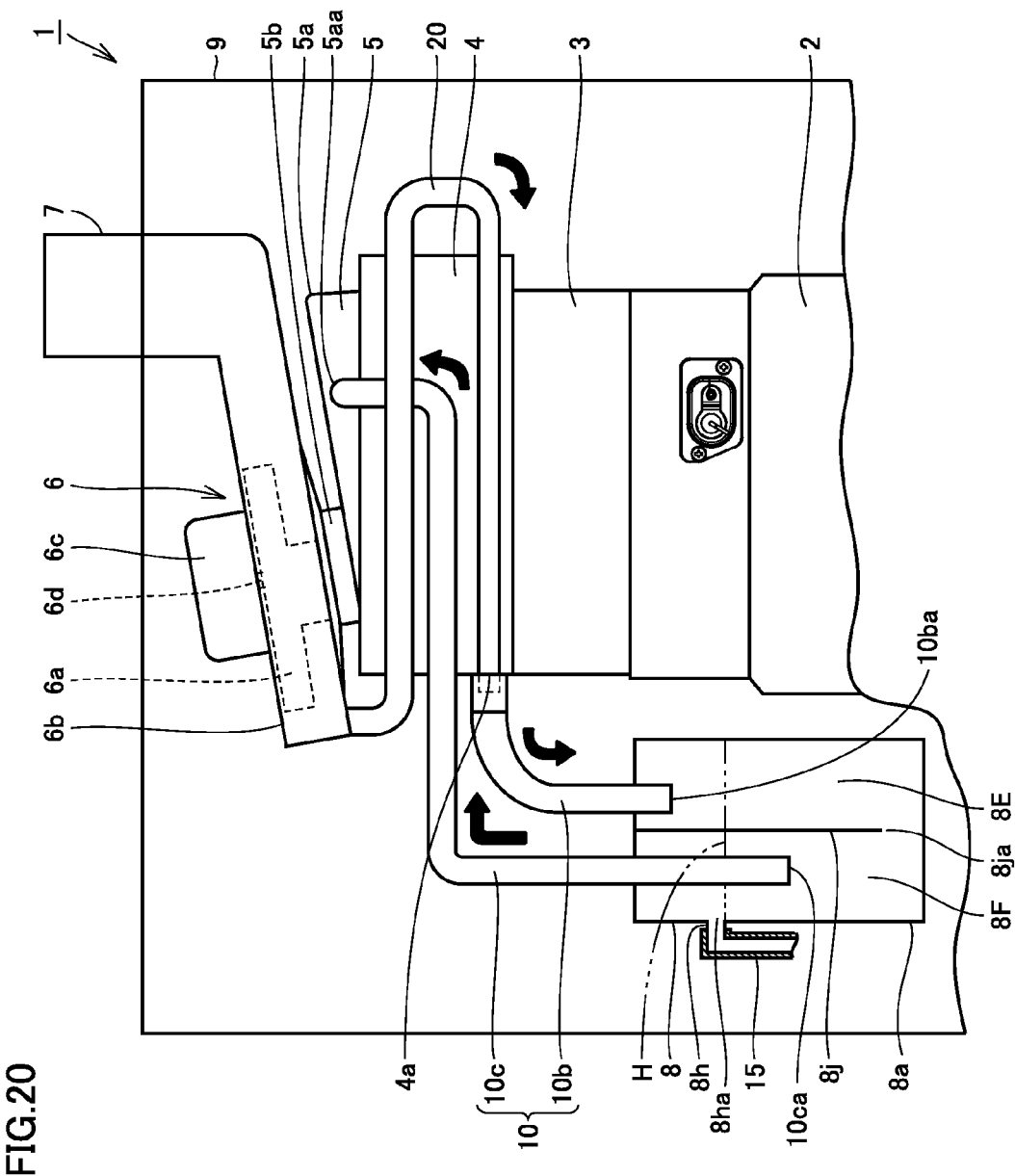
FIG. 20 is a partial front view schematically showing such a construction that a part of the fan drainage water drain pipe within the secondary heat exchanger at least reaches the drainage water drain port and the air passage pipe and the drainage water discharge pipe are connected to the drainage water tank as being separate from each other.

In each of the constructions in FIGS. 19 and 20, until water-seal is completed, as shown with arrows in the figures, the exhaust gas is directed to drainage water tank 8 from fan 6 through fan drainage water drain pipe 20 and drainage water discharge pipe 10b owing to a discharge pressure by fan 6. The gas within drainage water tank 8 is directed to fan 6 from drainage water tank 8 through air passage pipe 10c and exhaust box 5. Thus, in each of the constructions in FIGS. 19 and 20, a path through which a gas circulates from fan 6→fan drainage water drain pipe 20→drainage water discharge pipe 10b→drainage water tank 8→air passage pipe 10c→exhaust box 5→fan 6 can be formed.

Since the constructions in FIGS. 9 to 20 are otherwise substantially the same as the constructions of water heater 1 shown in FIGS. 1 to 5, the same elements have the same reference characters allotted and description thereof will not be repeated.

Though branch into two by a pipe connection portion (pipe joint 10d or drainage water tank 8) has been described in the embodiment above, branch into three or more may be applicable.

Figure 21:
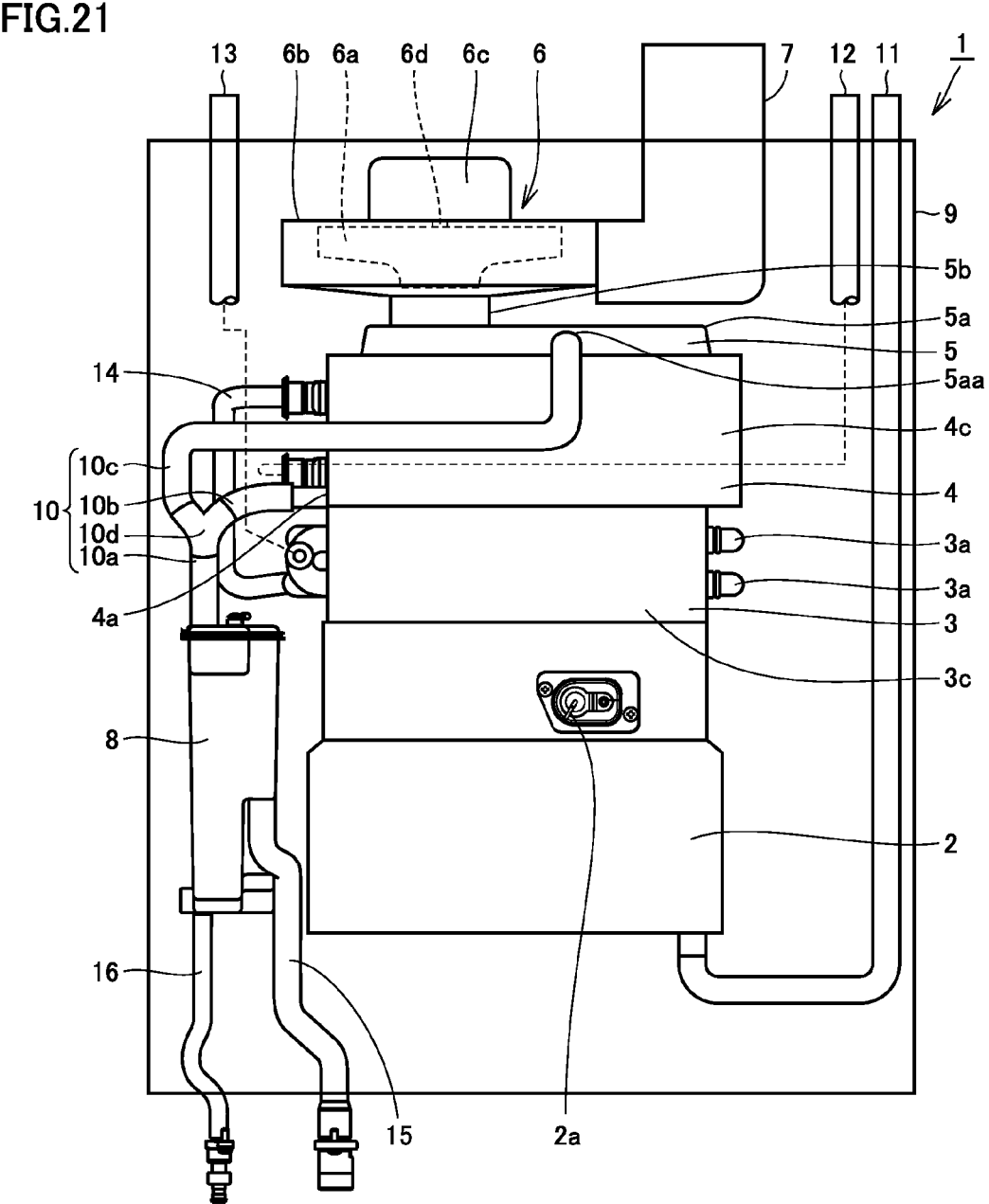
FIG. 21 is a front view schematically showing a construction of a water heater in another embodiment of the present invention.

Though the water heater in which fan 6 is placed as being inclined has been illustrated and described in the embodiment above, any embodiment above (including other embodiments in addition to the embodiment shown in FIG. 1) can be applied to a water heater as shown in FIG. 21 in which fan 6 is horizontally placed (such that a direction of an axis line of rotation shaft 6d of blade 6a extends in a vertical direction while the water heater is placed).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A water heater of a latent heat recovery type, capable of heating water by recovering latent heat of combustion gas, comprising:
    a burner which generates combustion gas;
    a heat exchanger which heats water which flows through inside, through heat exchange with combustion gas produced in said burner;
    a fan which suctions combustion gas which has passed through said heat exchanger and emits combustion gas to outside of said water heater;
    a drainage water discharge pipe which is connected to said heat exchanger and discharges drainage water produced as a result of recovery of latent heat by said heat exchanger to the outside of said heat exchanger;
    an air passage pipe connected to a path for flow of combustion gas from said heat exchanger to said fan; and
    a pipe connection portion which has a flow path allowing merging of said drainage water discharge pipe and said air passage pipe, said flow path after merging leading to the outside of said water heater.

2. The water heater according to claim 1, further comprising an exhaust box forming at least a part of said path for flow of combustion gas between said heat exchanger and said fan, wherein
    said air passage pipe is connected between said pipe connection portion and said exhaust box.

3. The water heater according to claim 2, wherein
    an inner diameter of said air passage pipe is set to be greater than an inner diameter of said drainage water discharge pipe.

4. The water heater according to claim 2, wherein
    said pipe connection portion is a pipe joint allowing merging of said drainage water discharge pipe and said air passage pipe,
    said water heater further comprises a tank connection pipe connected to said pipe joint and a drainage water tank connected to said pipe joint with said tank connection pipe being interposed,
    an inner diameter of said tank connection pipe is set to be greater than an inner diameter of said drainage water discharge pipe.

5. The water heater according to claim 2, wherein
    said pipe connection portion is a drainage water tank allowing merging of said drainage water discharge pipe and said air passage pipe, and
    said drainage water discharge pipe and said air passage pipe are connected to said drainage water tank as being separate from each other.

6. The water heater according to claim 2, wherein
    said pipe connection portion is a pipe joint allowing merging of said drainage water discharge pipe and said air passage pipe, and
    said water heater further comprises a trap pipe which is connected to said pipe joint and has a drain trap which can water-seal said flow path with drainage water.

7. The water heater according to claim 2, wherein
    said pipe connection portion is a pipe joint allowing merging of said drainage water discharge pipe and said air passage pipe,
    said water heater further comprises a fan drainage water drain pipe connected to said fan, for discharging drainage water in said fan to outside of said fan; a tank connection pipe connected to said pipe joint; and a drainage water tank connected to said pipe joint with said tank connection pipe being interposed, and
    said fan drainage water drain pipe is connected to said drainage water tank as being separate from said drainage water discharge pipe.

8. The water heater according to claim 1, wherein
    said fan includes a blade, a drive source, and a rotation shaft connecting said blade and said drive source to each other, and
    said air passage pipe opens into a region opposed to a direction of an axis line of said rotation shaft of said blade in said path for flow of combustion gas from said heat exchanger to said fan.

9. The water heater according to claim 1, wherein
said air passage pipe is connected between said pipe connection portion and said heat exchanger.

10. The water heater according to claim 9, wherein
said air passage pipe is connected at a position closer to said fan of said heat exchanger than said drainage water discharge pipe.

11. The water heater according to claim 1, wherein
an inner diameter of said air passage pipe is set to be greater than an inner diameter of said drainage water discharge pipe.

12. The water heater according to claim 1, wherein
said pipe connection portion is a pipe joint allowing merging of said drainage water discharge pipe and said air passage pipe,
said water heater further comprises a tank connection pipe connected to said pipe joint and a drainage water tank connected to said pipe joint with said tank connection pipe being interposed, and
an inner diameter of said tank connection pipe is set to be greater than an inner diameter of said drainage water discharge pipe.

13. The water heater according to claim 1, wherein
said pipe connection portion is a drainage water tank allowing merging of said drainage water discharge pipe and said air passage pipe, and
said drainage water discharge pipe and said air passage pipe are connected to said drainage water tank as being separate from each other.

14. The water heater according to claim 13, wherein
said drainage water tank includes a drainage water storage portion for storing drainage water and a drainage water discharge portion for discharging the drainage water in said drainage water storage portion to outside of said drainage water storage portion,
in said drainage water tank, a partition portion having a communication hole serves as partition between a first space into which said drainage water discharge pipe opens and a second space into which said air passage pipe opens,
an opening of said air passage pipe in said drainage water tank is located at a height position lower than a height position of a lower end portion of a drainage water discharge opening leading to said drainage water discharge portion provided in said drainage water storage portion, and
said second space is located downstream of said first space in a drainage water discharge path.

15. The water heater according to claim 1, wherein
said pipe connection portion is a pipe joint allowing merging of said drainage water discharge pipe and said air passage pipe, and
said water heater further comprises a trap pipe which is connected to said pipe joint and has a drain trap which can water-seal said flow path with drainage water.

16. The water heater according to claim 1, further comprising a fan drainage water drain pipe connected to said fan, for discharging drainage water in said fan to outside of said fan.

17. The water heater according to claim 16, wherein
said fan drainage water drain pipe is connected between said fan and said heat exchanger, and
a drainage water drain port of said heat exchanger leading to said drainage water discharge pipe is located on an extension of said fan drainage water drain pipe in said heat exchanger.

18. The water heater according to claim 16, wherein
said fan drainage water drain pipe is connected between said fan and said heat exchanger, and
said fan drainage water drain pipe is arranged so as to at least reach a drainage water drain port of said heat exchanger leading to said drainage water discharge pipe.

19. The water heater according to claim 1, wherein
said pipe connection portion is a pipe joint allowing merging of said drainage water discharge pipe and said air passage pipe,
said water heater further comprises a fan drainage water drain pipe connected to said fan, for discharging drainage water in said fan to outside of said fan, a tank connection pipe connected to said pipe joint, and a drainage water tank connected to said pipe joint with said tank connection pipe being interposed, and
said fan drainage water drain pipe is connected to said drainage water tank as being separate from said drainage water discharge pipe.

20. The water heater according to claim 19, wherein
said drainage water tank includes a drainage water storage portion for storing drainage water and a drainage water discharge portion for discharging the drainage water in said drainage water storage portion to outside of said drainage water storage portion, and
an opening of said fan drainage water drain pipe in said drainage water tank is located at a height position lower than a height position of a lower end portion of a drainage water discharge opening leading to said drainage water discharge portion provided in said drainage water storage portion.

* * * * *